US006956864B1

(12) United States Patent
Nankou et al.

(10) Patent No.: US 6,956,864 B1
(45) Date of Patent: Oct. 18, 2005

(54) DATA TRANSFER METHOD, DATA TRANSFER SYSTEM, DATA TRANSFER CONTROLLER, AND PROGRAM RECORDING MEDIUM

(75) Inventors: Takahiko Nankou, Sanda (JP); Hiroyuki Iitsuka, Katano (JP); Yasuo Nishiwaki, Moriguchi (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/463,155

(22) PCT Filed: May 19, 1999

(86) PCT No.: PCT/JP99/02624

§ 371 (c)(1),
(2), (4) Date: Jun. 9, 2000

(87) PCT Pub. No.: WO99/60753

PCT Pub. Date: Nov. 25, 1999

(30) Foreign Application Priority Data

May 21, 1998 (JP) ............................... H10-139453

(51) Int. Cl.$^7$ ............................................ H04L 12/40
(52) U.S. Cl. ...................................... 370/438; 370/439
(58) Field of Search ............................... 370/438, 439, 370/400, 426, 428

(56) References Cited

U.S. PATENT DOCUMENTS

| 5,696,879 | A | | 12/1997 | Cline et al. | |
|---|---|---|---|---|---|
| 5,845,250 | A | | 12/1998 | Vogten | |
| 6,091,734 | A | * | 7/2000 | Suzuki et al. | 370/410 |
| 6,384,928 | B2 | * | 5/2002 | Nagasawa et al. | 358/1.15 |
| 6,564,266 | B1 | * | 5/2003 | Goto et al. | 709/250 |
| 6,690,648 | B2 | * | 2/2004 | Niida et al. | 370/236 |
| 6,731,650 | B1 | * | 5/2004 | Yamagishi | 370/468 |
| 6,744,777 | B1 | * | 6/2004 | Takatsuji et al. | 370/426 |
| 6,766,384 | B2 | * | 7/2004 | Choi | 710/25 |

FOREIGN PATENT DOCUMENTS

| EP | 762384 | 3/1997 |
|---|---|---|
| EP | 776097 | 5/1997 |
| JP | 59-188258 | 10/1984 |
| JP | 1-295544 | 11/1989 |
| JP | 6-326718 | 11/1994 |

* cited by examiner

Primary Examiner—Kenneth Vanderpuye
(74) Attorney, Agent, or Firm—RatnerPrestia

(57) ABSTRACT

The present invention discloses a data transfer method wherein data is broken up into N datablocks (where the number N is a natural number) for transfer from a first node to a second node on a bus system each of whose nodes is assigned a node identifier, wherein the data transfer method comprises, prior to transfer of the datablock, a step in which a control node (1) issues to the second node a datablock reception instruction containing therein a node identifier of the first node and (2) issues to the first node a datablock transmission instruction containing therein a node identifier of the second node, thereafter, a step in which the datablock transfer from the first node to the second node is executed, after the datablock transfer is completed, a step in which the first node notifies the control node of a result of execution of the datablock transfer processing, and a step in which the second node notifies the control node of a result of execution of reception processing on the datablock.

24 Claims, 20 Drawing Sheets

4: DATA RECEPTION INSTRUCTION
5: DATA TRANSMISSION INSTRUCTION
6: DATA
7: DATA TRANSMISSION INSTRUCTION RESPONSE
8: DATA RECEPTION INSTRUCTION RESPONSE

4: DATA RECEPTION INSTRUCTION
5: DATA TRANSMISSION INSTRUCTION
6: DATA
7: DATA TRANSMISSION INSTRUCTION RESPONSE
8: DATA RECEPTION INSTRUCTION RESPONSE

10: PACKET HEADER PORTION

11: COMMAND FRAME PORTION

12: CRC PORTION

13: NODE IDENTIFIER OF PACKET RECEIVER

14: NODE IDENTIFIER OF PACKET SENDER

15: DATA TRANSMISSION INDICATION COMMAND CODE

16: DATABLOCK RETRANSMISSION REQUEST BIT

17: ERROR CODE STORING REGION

18: FINAL DATABLOCK NOTIFICATION BIT

19: NODE IDENTIFIER OF DATA RECEIVER

20: DATABLOCK NUMBER

21: DATABLOCK DATA LENGTH

10: PACKET HEADER PORTION
11: COMMAND FRAME PORTION
12: CRC PORTION
13: NODE IDENTIFIER OF PACKET RECEIVER
14: NODE IDENTIFIER OF PACKET SENDER
17: ERROR CODE STORING REGION
20: DATABLOCK NUMBER
21: DATABLOCK DATA LENGTH
22: DATABLOCK RECEPTION COMMAND CODE
23: NODE IDENTIFIER OF DATA SENDER

4: DATA RECEPTION INSTRUCTION

6: DATA

8: DATA RECEPTION INSTRUCTION RESPONSE

5: DATA TRANSMISSION INSTRUCTION
6: DATA
7: DATA TRANSMISSION INSTRUCTION RESPONSE

5: DATA TRANSMISSION INSTRUCTION
7: DATA TRANSMISSION INSTRUCTION RESPONSE
300: DATABLOCK
301: DATABLOCK
302: DATABLOCK

4: DATA RECEPTION INSTRUCTION

5: DATA TRANSMISSION INSTRUCTION

6: DATA TRANSFER PROCESS

7: DATA TRANSMISSION INSTRUCTION RESPONSE

8: DATA RECEPTION INSTRUCTION RESPONSE

10: PACKET HEADER PORTION
11: COMMAND FRAME PORTION
12: CRC PORTION
13: NODE IDENTIFIER OF PACKET RECEIVER
14: NODE IDENTIFIER OF PACKET SENDER
15: DATA TRANSMISSION INDICATION COMMAND CODE
17: ERROR CODE STORING REGION
19: NODE IDENTIFIER OF DATA RECEIVER

102: DATA RECEPTION COMMAND
103: DATA

103: DATA
104: DATA TRANSMISSION COMMAND

102: DATA RECEPTION COMMAND

103: DATA

104: DATA TRANSMISSION COMMAND

102: DATA RECEPTION COMMAND
103: DATA
104: DATA TRANSMISSION COMMAND
106: COPY COMMAND
107: FIRST ERROR NOTIFICATION
108: SECOND ERROR NOTIFICATION

DATA TRANSFER METHOD, DATA TRANSFER SYSTEM, DATA TRANSFER CONTROLLER, AND PROGRAM RECORDING MEDIUM

THIS APPLICATION IS A U.S. NATIONAL PHASE APPLICATION OF PCT INTERNATIONAL APPLICATION PCT/JP99/02624.

TECHNICAL FIELD

The present invention relates to a data transfer method, a data transfer system, a data transfer controller, and a program recording medium used for the transfer of data of the type which does not require real-time processing, such as still-image data or document data, among a plurality of devices.

BACKGROUND ART

In recent years, the market of equipment dealing with still-images such as digital still cameras and printers has been making steady expansion. So far, such devices have been used in the environment where personal computers exist. Recently, the user's need for easy handling of these devices in the non-PC environment is now increasingly growing.

In a conventional data transfer technology, when transceiving data of the type which does not require real-time processing (e.g., still-image data and document data) between two devices, generally one of the devices issues a command to the other for the exchange of the data therebetween.

FIG. 17 is a block diagram illustrating a first example of a still-image data system according to a conventional data transfer method. FIG. 17 shows a digital still camera 100 serving as an image input device and a printer 101 serving as an image output device. The user operates an operation button of the digital still camera 100 to select an internally-stored image and issues an instruction so that the selected image enters the printer 101. Then, the digital still camera 100 issues a data reception command 102 to the printer 101, thereby to bring the printer 101 into its data receivable state. This is followed by a transfer of data 103.

Referring next to FIG. 18, there is shown a second example of the still-image data system according to the conventional data transfer method. With reference to FIG. 18, an example case will be described in which the user operates an operation panel of the printer 101 so that a specified image is taken from the digital still camera 100. The user issues an instruction by operating an operation button of the printer 101 so that image data stored in the digital still camera 100 is to be taken therefrom. Then, the printer 101 issues a data transmission command 104 to the digital still camera 100. Upon receipt of the data transmission command 104, the digital still camera 100 carries out a process of transferring the data 103 to the printer 101.

Further, for the realization of networking of a plurality of terminal devices including the digital still camera 100 and the printer 101, a conventional example configuration shown in FIG. 19 has been known in the art. FIG. 19 is a diagram illustrating a third example of the still-image data system according to the conventional data transfer method. Referring to FIG. 19, an example case will be described in which a third device, such as a personal computer and digital TV set-top box, issues an instruction so that image data is transferred from the digital still camera 100 to the printer 101.

FIG. 19 shows a personal computer indicated by the reference numeral 105. In the first place, the personal computer 105 issues the data input command 104 to the digital still camera 100, so that the data 103 is temporarily stored in the personal computer 105. Next, the personal computer 105 issues the data output command 102 to the printer 101, and performs a process of transmitting to the printer 101 the stored data 103 previously received from the digital still camera 100. The same data (i.e., the data 103) is first transferred from the digital still camera 100 to the personal computer 105 and then transferred from the personal computer 105 to the printer 101. In other words, the transfer of the data 103 requires two process steps. Moreover, it is required to transfer the same data twice, resulting in increasing the processing time. In addition, there is produced the requirement that storage space for storing the data 103 be secured in the personal computer 105. Accordingly, the system becomes poor in operation efficiency.

Therefore, as a data transfer method capable of improving the efficiency of the aforesaid commonly-employed data transfer method, the COPY COMMAND (see Small Computer System Interface (SCSI), ANSI X3. 131-1986) has been proposed in the art.

FIG. 20 provides a description of the operation of a still-image data system employing a COPY COMMAND data transfer method.

FIG. 20 shows a COPY command indicated 106 by which the personal computer 105 directs the digital still camera 100 to transmit image data, a first error notification 107 by which an error occurring in the printer 101 is transmitted to the digital still camera 100, and a second error notification 108 by which the error occurrence in the printer 101 is transferred from the digital still camera 100 to the personal computer 105.

In the first place, the personal computer 105 issues to the digital still camera 100 the COPY command 106, the COPY command 106 containing therein an indication of TRANSFER IMAGE DATA TO PRINTER 101. The COPY command 106 contains the contents of the data reception command 102 (see FIG. 17), together with an identifier (SCSI ID) of the printer 101.

Upon receipt of the COPY command 106, the digital still camera 100 interprets the identifier of the printer 101 and the contents of the data reception command 102 which are contained in the received COPY command 106 and issues the data reception command 102 to the printer 101. This is followed by transmission of the data 103 to the printer 101 from the digital still camera 100.

Therefore, according to the improved data transfer method shown in FIG. 20, the digital still camera 100 can send the data 103 directly to the printer 101 when the third control device (i.e., the personal computer 105) issues a command indicative of a data transfer. Accordingly, in comparison with the configuration of FIG. 19, the method of FIG. 20 certainly provides improved processing efficiencies.

In the conventional configuration shown in FIG. 20, if an error (such as out of paper or paper jam) occurs in the printer 101 during data transfer therefore making it impossible for the printer 101 to continue data reception any more, the printer 101 will notify the digital still camera 100 of a state of the error by the issuing of the first error communication 107 of FIG. 20. Upon receipt of the error state notification from the printer 101, the digital still camera 100 notifies the personal computer 105 of such an error occurrence in the printer 101 by the issuing of the second error communication 108. Accordingly, it is not until the reception of the second error communication 108 that the personal computer 105 becomes aware of the fact that the error has occurred in the printer 101.

To sum up, in an error situation as described above, the personal computer 105 is not informed of occurrence of the error directly from a device in which the error has taken place. In other words, it is necessary to propagate an error notification within the system, which is inefficient. In addition to such a drawback, there is produced another problem that the personal computer 105 has to determine, upon receipt of an error notification from digital still camera 100, whether the notified error has occurred in the digital still camera 100 or in the printer 101. The contents of the processing become complicated accordingly.

Further, the COPY command 106 differs from the data reception and transmission commands 102 and 104 previously described by reference to FIG. 19 and other figures in that the COPY command 106 is used only in the presence of a third control device as shown in FIG. 20, so that, in order to cope with various device connection environments or system configurations, it has conventionally been necessary for each device to support these two commands which differ from each other in processing type.

As described above, for the case of a system which transfers still-image data by employing a data transfer method as shown in FIGS. 17 and 18 (that is, the transceiving of data is carried out by one device issuing a command to the other device) in a network structure in which a third control device (e.g., the personal computer 105 of FIG. 19) is connected in the middle, there is the problem that the system becomes poor in operation efficiency and requires a more-than-necessary processing time, as described above.

Further, even when employing the improved data transfer method shown in FIG. 20, processing at error occurrence time is inefficient as previously described. In addition, it is required to support both a command of a first type used in a one-to-one connection and a command of a second type different from the first type, in other words two different types of commands must be supported. As a result, the capacity of software that is installed on equipment grows unnecessarily large and the software becomes complicated.

SUMMARY OF THE INVENTION

Bearing in mind the above-described problems with the prior art techniques, the present invention was made. Accordingly, a first object of the present invention is to provide a data transfer method capable of flexibly coping with various system configurations, capable of providing improved processing efficiencies, and capable of easy error processing.

Further, a second object of the present invention is to provide a data transfer method capable of easy determination of the completion of data transfer and capable of transfers of data the lengths of which are unknown at the start of their transmission.

Further, a third object of the present invention is to provide a data transfer method capable of transferring, without the need for a control device to calculate the length of data that is to be transferred, the data with simple control.

Furthermore, a fourth object of the present invention is to provide a data transfer method capable of easily retransmitting data at the time when an error occurs.

Further, a fifth object of the present invention is to provide a data transfer method capable of achieving high-efficiency transfer of the same data to a plurality of devices.

Further, a sixth object of the present invention is to provide a data transfer method in which, even when transmitting the same data to a plurality of devices, the processing of devices at the data transmission end can be done in an easy manner and at high speed.

Further, a seventh object of the present invention is to provide a data transfer method capable of achieving data transfer with simple control by minimizing the number of commands which are issued by a control device, and capable of easily coping with a combination of devices at the data transmission and reception ends having different processing rates.

Further, an eighth object of the present invention is to provide a data transfer method capable of eliminating the need for a control device to control the length of datablocks.

Furthermore, a ninth object of the present invention is to provide a data transfer method capable of allowing a device at the data transmission end to easily accomplish packet division of a datablock to be transmitted according to the processing performance of a device at the data reception end.

Further, a tenth object of the present invention is to provide a data transfer method capable of allowing a device at the data reception end to make a change in data amount receivable at a time according to the internal processing state.

Finally, an eleventh object of the present invention is to provide a data transfer method capable of distinguishing between an error state and a device process wait state, even when a considerably slow device is employed either at the data transmission end or at the data reception end.

To solve the above problem, the one aspect of the present invention is a data transfer method wherein data is broken up into N datablocks (where the number N is a natural number) for transfer from a first node to a second node on a bus system each of whose nodes is assigned a node identifier, wherein prior to transfer of said datablock, a control node
(1) issues to said second node a datablock reception instruction containing therein a node identifier of said first node and (2) issues to said first node a datablock transmission instruction containing therein a node identifier of said second node;

thereafter, said datablock transfer from said first node to said second node is executed;

after said datablock transfer is completed, said first node notifies said control node of a result of execution of said datablock transfer processing; and said second node notifies said control node of a result of execution of reception processing on said datablock.

By virtue of the above-described arrangement, for example, not only in a case where devices are coupled together in a one-to-one fashion, but also in a third control device exists in the middle, it becomes possible to provide high-efficiency data transfers with the same command type. In addition to such an advantage, after completion of a data transfer, the first and second nodes notify the control node of their respective process (transmission and reception) execution results, thereby making it possible to efficiently detect the condition of an error occurring in a device.

Another aspect of the present invention is the data transfer method according to said 1st invention, wherein said control node issues said datablock transmission instruction after the issuing of said datablock reception instruction.

Still another aspect of the present invention is the data transfer method wherein said control node issues said datablock reception instruction after the issuing of said datablock transmission instruction.

By virtue of the above-described arrangement, for example, the control device is able to perform control of transfers of data without the need for the control device to know their respective data lengths, which makes it possible to simplify the transfer processing of the control device.

Yet another aspect of the present invention data transfer method, wherein, every time the transferring of each of said datablocks is completed, said first node notifies said control node of a result of execution of said datablock transfer processing, and of whether a datablock to be transferred next is the last of said datablocks.

By virtue of the above-described arrangement, for example, it becomes possible to perform data transfers with simple control, without the need for the control device to calculate the data length of data that is to be transferred.

Still yet another aspect of the present invention data transfer method,
wherein said datablock transmission instruction issued by said control node to said first node contains therein a data length of said datablock to be transferred; and
wherein said datablock reception instruction issued by said control node to said second node contains therein a data length of said datablock to be received.

The 9th invention of the present invention is the data transfer method, wherein, every time the transferring of each of said datablocks is completed, said first node notifies said control node of a result of execution of said datablock transfer processing and a data length of a datablock to be transferred next.

By virtue of the above-described arrangement, for example, it becomes possible to transfer undefined length data whose total length was unknown when its transfer was started.

A still further aspect of the present invention is the data transfer method, wherein, when said first node detects an error during the transfer of said datablock, said first node notifies said control node of a result of execution of said datablock transfer processing, and of a data retransfer request.

By virtue of the above-described arrangement, for example, it becomes possible to easily perform data retransmission at the time when an error occurs.

A yet further aspect of the present invention is the data transfer method, wherein, when transferring the same datablock from said first node to M nodes (where the number M is a natural number) said control node performs a process of issuing a transmission indication instruction of said same datablock M times while performing another process of making changes in identifier of said M nodes which are to receive said same datablock, and performs control to repeat said processes N times (where the number N is a natural number) corresponding to the number of said datablocks.

By virtue of the above-described arrangement, for example, it becomes possible to easily accomplish a system capable of almost simultaneously delivering the same data from a single device to a plurality of devices.

A still yet further aspect of the present invention is the data transfer method, wherein, at the time when said control node issues to said first node said datablock transmission instruction, a flag is contained which indicates whether a datablock transmission instruction, which is scheduled to be issued next, directs said first node to transfer (a) the same datablock or (b) the next datablock.

By virtue of the above-described arrangement, for example, it becomes possible to predetect whether the first node remains in the state of holding the same data block or is required to prepare for the next data block, thereby improving the internal processing efficiency of the first node.

An additional aspect of the present invention is the data transfer method, wherein a transfer of data from said first node to said second node is carried out by repetition of performing each of the following steps of:

(1) a first step in which said second node transmits to said first node a notification representative of a data receivable state;

(2) a second step in which, at the time when said datablock is ready for transfer after reception of said notification from said second node, said first node performs an operation of transferring said datablock to said second node; and (3) a third step in which said first node transmits to said second node a notification representative of completion of said datablock transfer.

By virtue of the above-described arrangement, for example, when viewed from the control node, processing is carried out as if data were not divided (i.e., N=1) at its transfer time, so that the number of times the control command issues a command to the first and second nodes is reduced. Therefore, it becomes possible to simplify the processing of the control node. Further, it is designed such that the first device notifies the second device of the fact that a certain data block is ready for transmission, and that the second device notifies the first device of the fact that the second device is ready for reception of the data block. It therefore becomes possible to easily cope with a combination of devices at the data transmission and reception ends having different processing rates.

A still additional aspect of the present invention is the data transfer method, wherein said notification of said first step contains therein a maximum data length receivable by said second node at said second step.

By virtue of the above-described arrangement, for example, it becomes possible for the first node to detect, based on the foregoing maximum data length information, a datablock length receivable by the second node, directly from the second node. Accordingly, there is no need for the control node in charge of issuing commands to control the data length of datablocks, which makes it possible to provide simplified data transfer.

A yet additional aspect of the present invention is the data transfer method invention,
wherein, in said datablock transfer at said second step, said datablock to be transferred is broken up into one or more packets; and
wherein said notification of said first step contains therein a maximum data length receivable by said second node for one packet.

By virtue of the above-described arrangement, for example, it becomes possible to easily cope with devices having various packet reception capacities, for it is possible to subject the data to be transferred by the first node at the second step to optimal packet division according to the reception capacity of the second node on the basis of the foregoing maximum data length information.

A still yet additional aspect of the present invention is the data transfer method, wherein said maximum data length receivable by said second node is a value variable depending upon the internal processing state of said second node.

By virtue of the above-described arrangement, for example, it becomes possible to optimally control and use internal resources such as memory of the second node.

Another aspect of the present invention is the data transfer method, wherein after a predetermined time a has elapsed since said notification of said third step was completed, (1) said first node performs a process of stopping the transfer of said datablock in the absence of reception of said notification of said first step from said second node; or (2) if said second node fails to enter a receivable state within a predetermined time b (b<a), said second node transmits to said first node a notification representative of an unreceivable state thereby to cause said first node to change to a wait state for waiting for notification from said second node, and starts remeasuring the predetermined time a.

By virtue of the above-described arrangement, for example, it becomes possible to correctly distinguish between an error state and a device process wait state even when using a very slow device at the data reception end.

Still another aspect of the present invention is the data transfer method,
wherein, after a predetermined time c has elapsed since said notification of said first step was completed, (1) said second node performs a process of stopping the reception of said datablock (i.e., transfer of data) in the absence of reception of said datablock from said first node; or (2) if said first node fails to enter a transmittable state within a predetermined time d (d<c), said first node transmits to said second node a notification representative of an untransmittable state thereby to cause said second node to change to a wait state for waiting for notification from said first node, and starts remeasuring the predetermined time c.

By virtue of the above-described arrangement, for example, it becomes possible to correctly distinguish between an error state and a device process wait state even when using a very slow device at the data transmission end.

Yet another aspect of the present invention is a data transfer system in which data is broken up into N datablocks (where the number N is a natural number) for transfer from a first node to a second node on a bus system each of whose nodes is assigned a node identifier,
wherein said data transfer system comprises a control node, said control node (1) issuing to said second node a datablock reception instruction containing therein a node identifier of said first node and (2) issuing to said first node a datablock transmission instruction containing therein a node identifier of said second node, prior to said datablock transfer;
wherein said first node (1) transfers said datablock to said second node after said datablock reception instruction and said datablock transmission instruction are issued from said control node, and (2) notifies said control node of a result of execution of said datablock transfer processing after said datablock transfer is completed; and
wherein said second node notifies said control node of a result of execution of reception processing on said datablock transferred from said first node.

Still yet another aspect of the present invention is the data transfer controller comprising control means wherein, at the time when data is broken up into N datablocks (where the number N is a natural number) for transfer from a first node to a second node on a bus system each of whose nodes is assigned a node identifier, prior to said datablock transfer, said control means (1) issues to said second node a datablock reception instruction containing therein a node identifier of said first node and (2) issues to said first node a datablock transmission instruction containing therein a node identifier of said second node, wherein said first node (1) transfers said datablock to said second node after said datablock reception instruction and said datablock transmission instruction are issued from said control means, and (2) notifies said control means of a result of execution of said datablock transfer processing; and
wherein said second node notifies said control means of a result of execution of reception processing on said datablock transferred from said first node.

Such arrangement is able to provide an improved data transfer method capable of flexibly coping with various system configurations, capable of achieving high processing efficiencies, and capable of providing simple error processing.

DESCRIPTION OF REFERENCE NUMERALS

Figure 1:
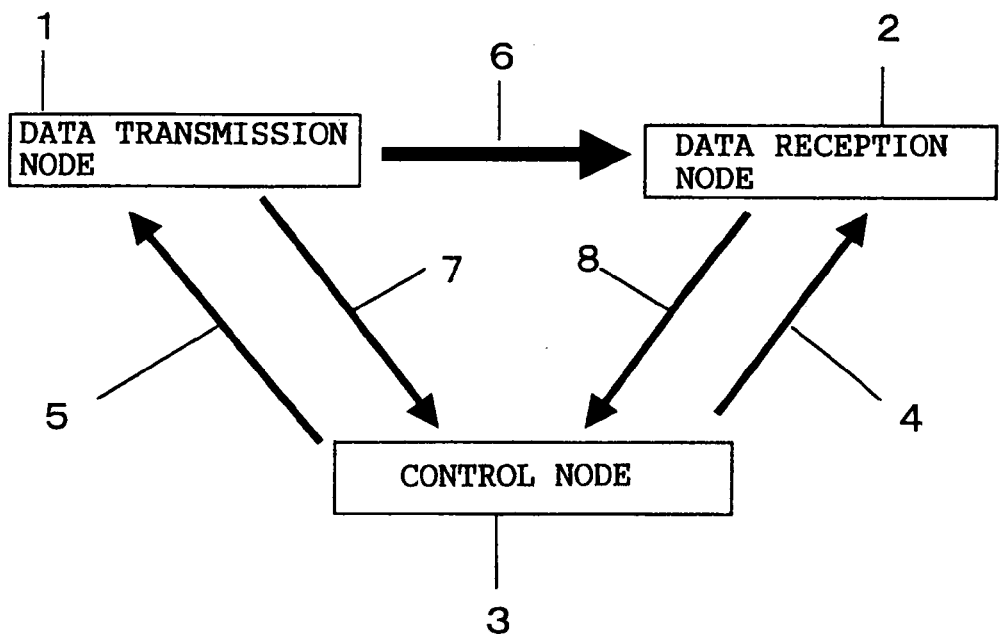
FIG. 1 is a block diagram of a system employing a data transfer method according to a first embodiment of the present invention.

1 DATA TRANSMISSION NODE
2 DATA RECEPTION NODE
3 CONTROL NODE
4 DATA RECEPTION INSTRUCTION
5 DATA TRANSMISSION INSTRUCTION
6 DATA
7 DATA TRANSMISSION INSTRUCTION RESPONSE
8 DATA RECEPTION INSTRUCTION RESPONSE

BEST MODE FOR CARRYING OUT THE INVENTION

Hereinafter, embodiments of the present invention will concretely be described with reference to the drawing figures.

First Embodiment

FIG. 1 shows in block form a data transfer system which is a first embodiment of a data transfer method according to the present invention. FIG. 1 shows a data transmission node 1 (a first node) which is implemented by a device for delivering an image, such as a digital still camera, a data reception node 2 (a second node) which is implemented by a device for receiving an image, such as a printer, and a control node 3 such as a personal computer or set-top box. These nodes (devices) are coupled to the same bus system. A data transfer control device of the present invention corresponds to the control node 3.

In the present embodiment, as bus system, the IEEE Std. 1394-1995, Standard for a High Performance Serial Bus (hereinafter called the IEEE 1394-1995) is employed and the description will be made using an example case in which data transfer is done between devices coupled to an IEEE 1394-1995 bus.

The reference numeral 4 denotes a data reception instruction which is issued from the control node 3 to the data reception node 2. The reference numeral 5 denotes a data transmission instruction which is issued from the control node 3 to the data transmission node 1. The reference numeral 6 denotes a piece of data that is transferred from the data transmission node 1 to the data reception node 2. Further, the reference numeral 7 denotes a data transmission instruction response by which the control node 3 is informed of a result of execution of the data transmission instruction 5 from the data transmission node 1. The reference numeral 8 denotes a data reception instruction response by which the control node 3 is informed of a result of execution of the data reception instruction 4 from the data reception node 2.

Here, all of the data reception instruction 4, the data transmission instruction 5, the data transmission instruction response 7, and the data reception instruction response 8 are for the transmission of commands and responses by the use of the Function Control Protocol (hereinafter called the FCP) defined by IEC-61883, Proposed Standard for Digital Interface for Consumer Electronic Audio/Video Equipment, and are executed according to the rules of the AV/C Digital Interface Command Set (hereinafter called the AV/C command).

Figure 2:
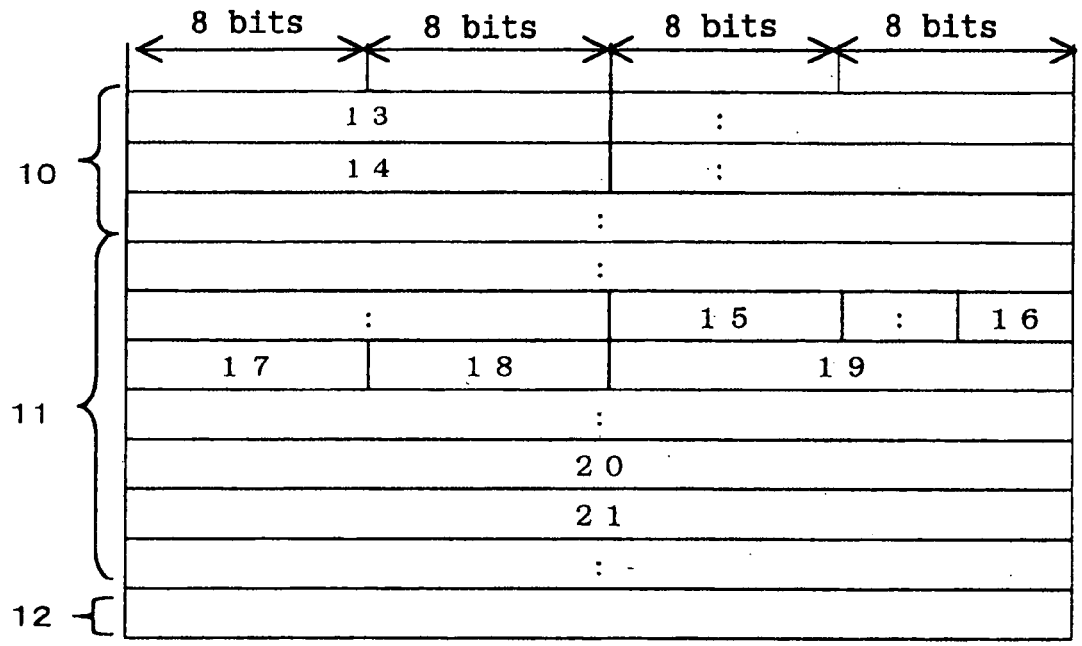
FIG. 2 is a diagram illustrating a data format used for a data transmission instruction and a data transmission instruction response according to the first embodiment of the present invention.

Referring now to FIG. 2, there is illustrated a data format used for the data transmission instruction 5 and the data transmission instruction response 7. In FIG. 2, the reference numeral 10 denotes a packet header portion. In addition, the reference numeral 11 denotes a datablock (command frame) portion. The reference numeral 12 denotes a CRC portion. These three portions 10, 11, and 12 together constitute an IEEE 1394-1995 asynchronous write packet. FIG. 2 further shows a 16-bit node identifier of packet receiver 13, and a 16-bit node identifier of packet receiver [sic] 14. These identifiers 13 and 14 are also IEEE 1394-1995 identifiers.

In the AV/C command, the datablock portion 11 contains therein data as to an instruction or instruction response with respect to a node. Here, the data transmission instruction 5 and the data transmission instruction response 7 have a common data format. The data transmission node 1 operates as follows. The data transmission node 1 receives the data transmission instruction 5, executes processing, rewrites the value of a specified field of the previously-received datablock transmission instruction 5 as the need arises, and thereafter transfers this packet as the data transmission instruction response 7 to the control node 3.

Here, the reference numeral 15 denotes a data transmission indication command. The reference numeral 16 denotes a datablock retransmission request bit. The reference numeral 17 denotes an error code storing region. The reference numeral 18 denotes a final datablock notification bit. The reference numeral 19 denotes a node identifier of data receiver. The reference numeral 20 denotes a datablock number. The reference numeral 21 denotes a datablock data length.

Figure 3:
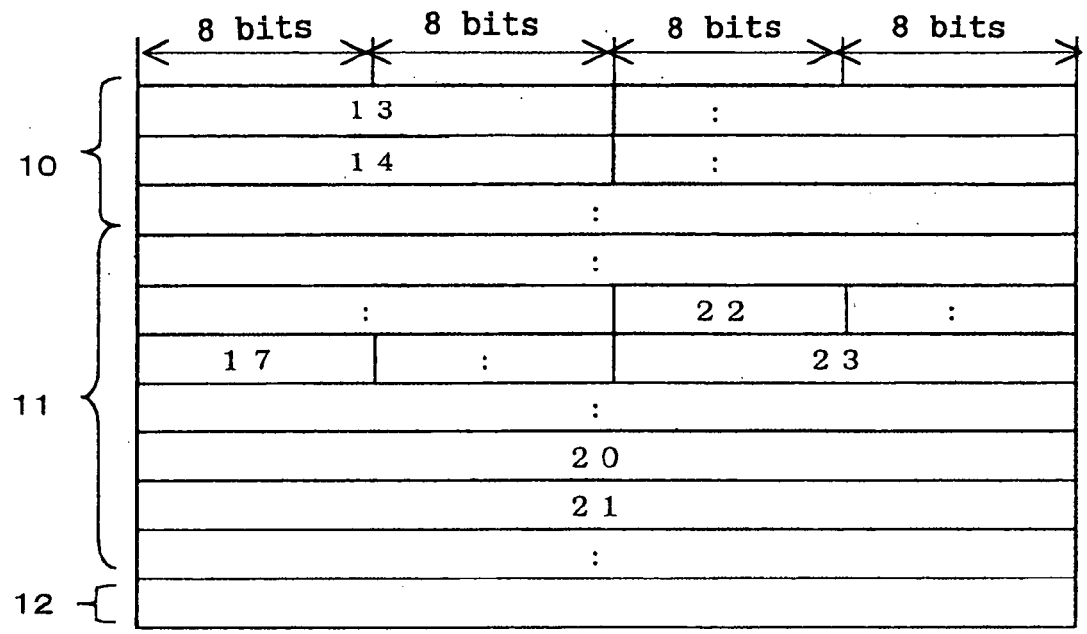
FIG. 3 is a diagram illustrating a data format used for a data reception instruction and a data reception instruction response according to the first embodiment of the present invention.

Referring now to FIG. 3, there is illustrated a data format used for the data reception instruction 4 and the data reception instruction response 8. FIG. 3 shows constitutional elements most of which are common to those of the data format of FIG. 2, and the description of fields having the same meaning will be omitted. FIG. 3 shows a datablock reception command 22 indicative of data block reception and a node identifier of data sender 23.

A data transfer operation, in which data is transferred from the data transmission node 1 to the data reception node 2 under the control of the control node 3, will be described below. And, in the present embodiment, an example case, in which data for a single still-image sheet is divided into a plurality of datablocks which are then transferred respectively one after another, will be described.

Figure 4:
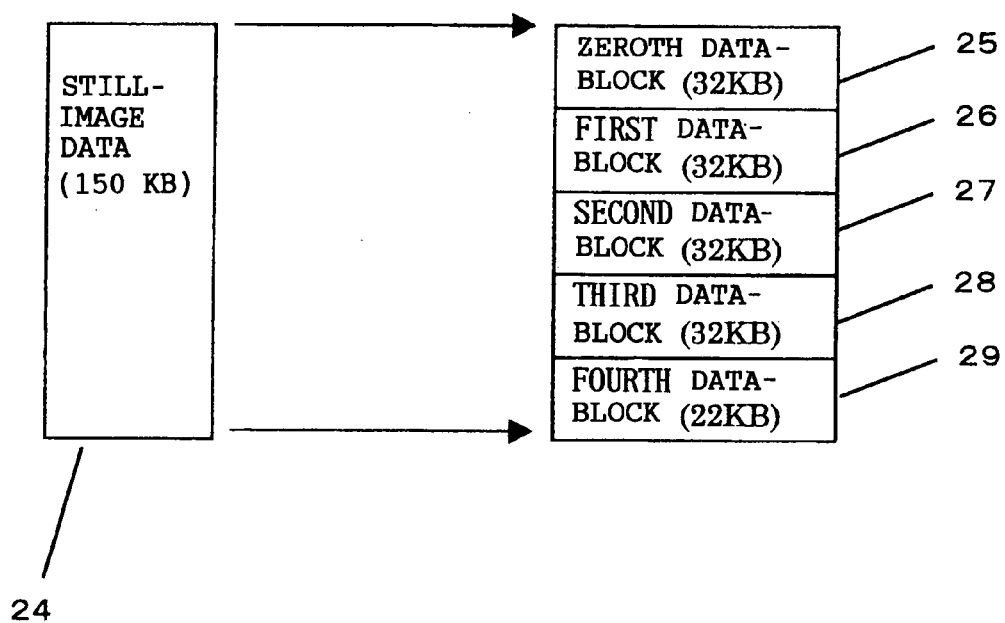
FIG. 4 is a diagram illustrating a way of dividing still-image data according to the first embodiment of the present invention.

FIG. 4 illustrates a way of dividing still-image data into datablocks. Referring to FIG. 4, the reference numeral 24 denotes still-image data of 150 K bytes stored in the data transmission node 1. The still-image data 24 is broken up into five individual datablocks, wherein the maximum capacity is 32 Kbytes. FIG. 4 illustrates a zeroth datablock identified by the reference numeral 25, a first datablock identified by the reference numeral 26, and a second datablock identified by the reference numeral 27, and a third datablock identified by the reference numeral 28. The data length of the datablocks 25–28 is 32 K bytes. The reference numeral 29 denotes a fourth datablock which is the last datablock, having a data length of 22 K bytes.

For example, a data transfer operation of transmitting the zeroth datablock 25 from the data transmission node 1 to the data reception node 2, will be described below.

The control node 3 first issues the data reception instruction 4 having a packet format as shown in FIG. 3, to the data reception node 2. The values of respective fields of the packet thus issued are shown in TABLE 1. Here, the datablock number 20 is set at a value of 0. Such a setting is indicative of a transfer of the zeroth datablock 25 and the datablock length 21 thereof is set to a value of 32 K bytes. Furthermore, the error code storing region 17 is provided so that, when the data reception node 2 issues the data reception instruction response 8 to the control node 3, an error code representative of an error occurring in a field can be set. Accordingly, at this point in time, FF in hexadecimal notation is stored in the data reception instruction 4, representing that the value of the field is invalid.

TABLE 1

| Data field | Value |
| --- | --- |
| Node identifier of packet receiver | Node identifier of data reception node 2 |
| Node identifier of packet sender | Node identifier of control node 3 |
| Command code | Data reception indication |
| Error code storing region | FF(16) |
| Node identifier of data sender | Node identifier of data transmission node 1 |
| Datablock number | 0 |
| Datablock data length | 32 KB |

Upon receipt of the data reception instruction 4, the data reception node 2 sends to the control node 3 a notification informing that the issue of the data reception instruction 4 is successful. Thereafter, the data reception node 2 enters the wait state, waiting for the data transmission node 1 to transmit the data thereto.

Next, the control node 3 receives the aforesaid notification from the data reception node 2 and, after having confirmed that the data reception instruction 4 was issued successfully, issues the data transmission instruction 5 having a packet format as shown in FIG. 2, to the data transmission node 1. The values of respective fields of the packet thus issued are shown in TABLE 2. Here, the description of fields having the same meaning as those of the data reception instruction 4 is omitted.

TABLE 2

| Data field | Value |
| --- | --- |
| Node identifier of packet receiver | Node identifier of data transmission node 1 |
| Node identifier of packet sender | Node identifier of control node 3 |
| Command code | Data transmission indication |
| Datablock retransmission request bit | 0 |
| Error code storing region | FF(16) |
| Final datablock notification bit | 1 |

TABLE 2-continued

| Data field | Value |
| --- | --- |
| Node identifier of data receiver | Node identifier of data reception node 2 |
| Datablock number | 0 |
| Datablock data length | 32 KB |

Here, the datablock retransmission request bit 16 is set at a value of 0, which indicates that, if the transfer of the current datablock is completed normally, the next datablock (the first datablock 26 in this case) is scheduled to be transferred. When the data transmission node 1 issues the data transmission instruction response 8 to the control node 3 after completion of the transfer of the indicated datablock, if a datablock which is scheduled to be transferred at the next step happens to be the last datablock, the final datablock notification bit 18 is set at 1 (otherwise at 0). Accordingly, in the data transmission instruction 5, the final datablock notification bit 18 is set at 1 in order to indicate that the value of the field is invalid.

Upon receipt of the data transmission instruction 5, the data transmission node 1 notifies the control node 3 of the fact that the issuing of the data transmission instruction 5 was carried out successfully. Thereafter, the data transmission node 1 commences the transfer of the zeroth datablock 25 to the data reception node 2.

Here, datablock transfer is carried out such that a datablock to be transferred is broken up into one or more IEEE 1394-1995 asynchronous write packets that are issued in succession.

In the IEEE 1394-1995, the ACK packet is returned from the data reception end with respect to an asynchronous write packet, thereby making it possible to determine, at the data transmission end, whether the asynchronous write packet was normally sent to the data reception end. Accordingly, it is possible to retransmit the packet when it was not previously transmitted normally.

Further, the IEEE 1394-1955 asynchronous write packet contains, in its packet header portion, a node identifier of a packet transmission node, so that, even when data is transmitted to the data reception node 2 from a node other than the data transmission node 1, the data reception node 2 ignores the data thus transmitted.

These asynchronous write packets contain therein an offset address indicative of a data reception buffer region included in an address space of the data reception node 2.

Suppose here that a head address of the data reception buffer region is acquired by an AV/C command issued prior to these processes, and that the data transmission node 1 is preinformed of such a head address. The first of more than one asynchronous packet to be transmitted contains an offset address which is the head address of the data reception buffer region. The next packet (i.e., the second packet) contains an offset address which is set to be an address obtained by addition of the head address of the data reception buffer region and the data length of the first data packet.

In the way describe above, one datablock contains an offset address as a result of sequential address increase from the head of the data reception buffer region of the data reception node 2, and packet retransmission can be implemented by transmitting a packet having the same offset address a plurality of times.

Next, the data transmission node 1, which has successfully completed the transfer of the zeroth datablock 25, first confirms that the datablock retransmission request bit 16 of the data transmission instruction 5 already received is set at a value of 0, and then learns the fact that a datablock that is required to be transferred next is the first datablock 26 after the zeroth datablock 25. Then, the data transmission node 1 further learns the fact that the datablock data length of the first datablock 26 is 32 K bytes, which indicates that the first datablock 26 is not the last datablock.

Therefore, the data transmission node 1 issues to the control node 3 the data transmission instruction response 7 including these pieces of information.

Here, the data transmission instruction response comprises a packet format as shown in FIG. 2 and the values of its major fields are shown in TABLE 3. Although, with regard to the contents of these values, the values shown in TABLE 2 are basically returned intact, there is made a replacement between the packet transmission node identifier and the packet reception node identifier, representing that the packet is from the data transmission node 1 to the control node 3. Since there has occurred no error during the data transfer, a code indicative of the absence of an error is set in the error code storing region 17. The datablock to be transmitted next is the first datablock 26 having a datablock length of 32 K bytes, so that the datablock number 20 and the datablock length 21 are set to a value of 1 and to a value of 32 K bytes, respectively.

TABLE 3

| Data field | Value |
| --- | --- |
| Node identifier of packet receiver | Node identifier of control node 3 |
| Node identifier of packet sender | Node identifier of data transmission node 1 |
| Command code | Data transmission indication |
| Datablock retransmission request bit | 0 |
| Error code storing region | No error |
| Final datablock notification bit | 0 |
| Datablock number | 1 |
| Datablock data length | 32 KB |

Meanwhile, after having received the zeroth datablock 25 successfully, the data reception node 2 starts processing the zeroth datablock 25 received. For example, in the case the data reception node 2 is implemented by a printing machine, the received datablock is transferred to its internal printer engine where the printing thereof starts.

At the time when the processing of the zeroth datablock 25 is completed, the data reception node 2 issues the data reception instruction response 8 to the control node 3.

Here, the data reception instruction response 8 comprises a packet format as shown in FIG. 3 and the values of its major fields are shown in TABLE 4. Although, with regard to the contents of these values, the values shown in TABLE 1 are basically returned intact, there is made a replacement between the packet transmission node identifier and the packet reception node identifier, representing that the packet is from the data reception node 2 to the control node 3. Since there has occurred no error during the data transfer, a code indicative of the absence of an error is set in the error code storing region 17.

TABLE 4

| Data field | Value |
| --- | --- |
| Node identifier of packet receiver | Node identifier of control node 3 |
| Node identifier of packet | Node identifier of data |

TABLE 4-continued

| Data field | Value |
| --- | --- |
| sender | reception node 2 |
| Command code | Data reception indication |
| Error code storing region | No error |
| Datablock number | 0 |
| Datablock data length | 32 KB |

Which one of the data transmission instruction response 7 returned from the data transmission node 1 to the control node 3 and the data reception instruction response 8 returned from the data reception node 2 to the control node 3 is issued before the other, will vary depending upon the process speed of the data transmission and reception nodes 1 and 2. This causes the control node 3 to have to wait for these two nodes to respond thereto.

At the time when the control node 3 receives the responses 7 and 9 from the data transmission and receipt nodes 1 and 2, the transfer of the zeroth datablock 25 is completed.

Next, the control node 3 starts a process of transferring the next datablock (i.e., the first datablock 26). More specifically, the data transmission instruction response 7, previously received from the data transmission node 1, contains therein pieces of information that the datablock number 20 to be transmitted next is 1 and the datablock length 21 is 32 K bytes (i.e., the length of the first datablock 26). By the use of these values, the transfer of the first datablock 26 starts.

In the way described above, as for the length of a datablock that is to be transmitted next, there is no need for asking such a datablock length to the data transmission node 1 in every processing. This allows the control node 3 to easily perform data transfers.

Next, by reference to FIG. 1, a case, in which an error occurs in the data reception node 2 during transmission of a datablock, will be described. More specifically, an example case is explained in which a paper jam error takes place in the data reception node 2 serving as a printing device.

For instance, suppose that, during the transfer of the zeroth datablock 25, the data reception node 2 undergoes a paper jam error and is judged to be in the data unreceivable state incapable of continuous data reception.

In such an error situation, the data reception node 2 issues to the control node 3 the data reception instruction response 8 notifying that the paper jam error has occurred therein. The data reception instruction response 8 takes a packet format as shown in FIG. 3 wherein an error code for the paper jam error is set in its error code storing region 17.

Meanwhile, the data transmission node 1 receives an ACK packet from the data reception node 2. From the ACK packet received, the data transmission node detects that the data reception node 2 abruptly stopped data reception and, therefore, brings the datablock transmission to a halt to issue to the control node 3 the data transmission instruction response 7 notifying that there has occurred an error. The data transmission instruction response 7 takes a packet format as shown in FIG. 2 and the values thereof that are set in respective data fields are shown in TABLE 5.

TABLE 5

| Data field | Value |
| --- | --- |
| Node identifier of packet receiver | Node identifier of control node 3 |

TABLE 5-continued

| Data field | Value |
| --- | --- |
| Node identifier of packet sender | Node identifier of data transmission node 1 |
| Command code | Data transmission indication |
| Datablock retransmission request bit | 0 |
| Error code storing region | Transmission time out error occurrence |
| Final datablock notification bit | 0 |
| Datablock number | 0 |
| Datablock data length | 32 KB |

Set in the error code storing region 17 is an error code for the transmission time out error. Further, the occurrence of the error causes the zeroth datablock 25 to fail to be transmitted, so that a value of 0 is set in the field of the datablock number 20 of FIG. 2 while a value of 32 K bytes is set in the field of the datablock data length 21 of FIG. 2. Such setting means that the control node 3 is requested to transfer the zeroth datablock 25 as the datablock transfer.

After having detected that the paper jam error in the data reception node 2 is canceled, the control node 3 resumes transferring the zeroth datablock 25 by making use of the values of the datablock number 20 and the datablock data length 21 previously sent from the data transmission node 1.

As described above, even when some errors occur in a node under data exchange, a notification of the error is issued directly to the control node 3.

Additionally, at the time when an error occurs during transmission of a certain datablock, it is designed such that the data transmission node 1 will notify the control node 3 of the datablock number and the datablock data length of that datablock, which arrangement makes it possible for the control node 3 to easily perform, based on these pieces of information, a retransmission of the datablock.

The above-described steps are repeatedly carried out, whereby sequential datablock transfer from the data transmission node 1 to the data-reception node 2 can be executed.

Next, the operation at data transfer completion time will be described below.

At the point in time when the data transmission node 1 successfully completes the transmission of the third datablock 28, the data transmission node 1 confirms that the datablock retransmission request bit 16 of the data transmission instruction 5 already received is set at a value of 0 and learns that the datablock that is requested to be transferred next is the fourth datablock 29 after the third datablock 28. The data transmission node 1 further recognizes that the fourth datablock 29 is the last datablock since it has a datablock data length of 22 K bytes.

Therefore, the data transmission node 1 issues to the control node 3 the data transmission instruction response 7 including such pieces of information.

Here, the data transmission instruction response comprises a packet format as shown in FIG. 2 and the values of its major data fields are shown in TABLE 6. Although, with regard to the contents of these values, the values shown in TABLE 2 are returned intact, a value of 4 and a value of 22 K bytes are set as the datablock number 20 and as the datablock data length 21, respectively, because the datablock that is to be transmitted next is the fourth datablock 29 having a datablock data length of 22 K bytes. Further, since the datablock that is scheduled to be transmitted next, i.e., the fourth datablock 29, is the last datablock, this causes the final datablock notification bit 18 to be set at a value of 1.

TABLE 6

| Data field | Value |
| --- | --- |
| Node identifier of packet receiver | Node identifier of control node 3 |
| Node identifier of packet sender | Node identifier of data transmission node 1 |
| Command code | Data transmission indication |
| Datablock retransmission request bit | 0 |
| Error code storing region | No error |
| Final datablock notification bit | 1 |
| Datablock number | 4 |
| Datablock data length | 22 KB |

Upon receipt of the data transmission instruction response 7, the control node 3 detects that the next datablock data transmission is final, from the fact that the final datablock notification bit 18 assumes a value of 1. After the fourth datablock 29 is transferred, the entire processing is over.

Here, the control node 3 performs transfers of datablocks one after another as long as the final datablock notification bit 18 of the data transmission instruction response 7 issued from the data transmission node 1 assumes a value of 0, without having to become aware of the total number of times a datablock is transferred. On the other hand, if the final datablock notification bit 18 assumes a value of 0, then the next datablock transfer is determined to be final. As a result of such arrangement, there is no need for the control node 3 to calculate the number of datablocks in advance and its control processing becomes considerably simple. Further, a transfer of undefined length data, the data length of which is unknown when its transfer was started, can be realized easily.

Second Embodiment

Figure 5:
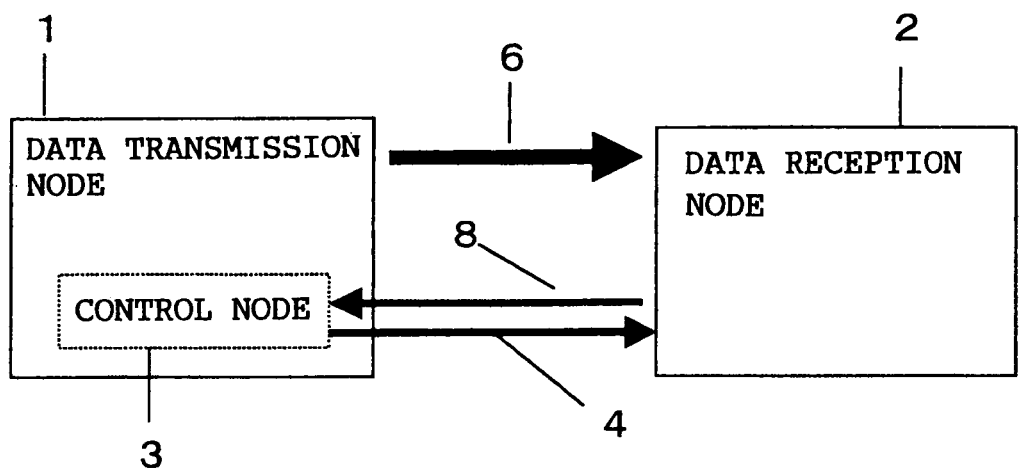
FIG. 5 is a block diagram of a system employing a data transfer method according to a second embodiment of the present invention.

A second embodiment of the present invention will now be described. FIG. 5 shows in block form a system as the second embodiment of the data transfer method of the present invention. The second embodiment is basically the same as the first embodiment shown in FIG. 1. Therefore, detailed descriptions are not provided of constitutional elements and operations of the system of the present embodiment.

The second embodiment shown in FIG. 5 differs from the previously-described first embodiment in that the control node 3 and the data transmission node 1 are one and the same node.

Referring to FIG. 5, both the data transmission instruction 5 and the data transmission instruction response 7, shown in FIG. 1, are internally issued and internally processed in the same node, so that their packet data are not delivered onto the bus.

On the other hand, the data reception instruction 4 that is issued to the data reception node 2 takes completely the same packet format as the one in the first embodiment shown in FIG. 3.

Here, only the difference between the first embodiment and the present embodiment is that the node identifier of packet receiver 13 and the node identifier of data sender 23 take the same value.

Apart from the above, with regard to the operation of the second embodiment and the method of controlling the data reception node 2, it is possible to perform data transfers by performing the same processing as in the previously-described first embodiment.

Third Embodiment

Figure 6:
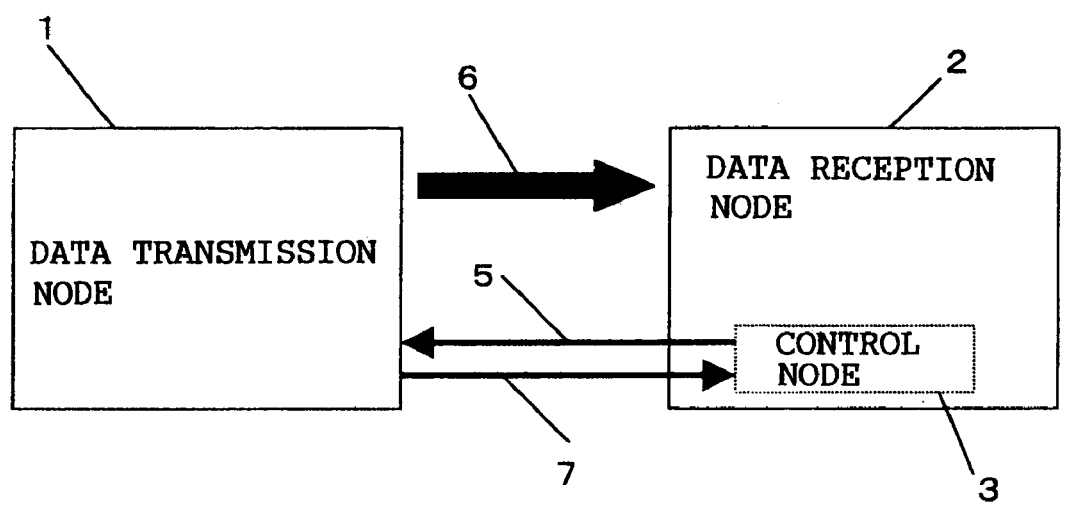
FIG. 6 is a block diagram of a system employing a data transfer method according to a third embodiment of the present invention.

A third embodiment of the present invention will now be described. FIG. 6 shows in block form a system as the third embodiment of the data transfer method of the present invention. The third embodiment is basically the same as the first embodiment shown in FIG. 1. Therefore, detailed descriptions are not provided of constitutional elements and operations of the system of the present embodiment.

The third embodiment shown in FIG. 6 differs from the previously-described first embodiment in that the control node 3 and the data reception node 2 are one and the same node.

Referring to FIG. 6, both the data reception instruction 4 and the data reception instruction response 8, shown in FIG. 1, are internally processed, so that their packet data are not delivered onto the bus.

On the other hand, the data transmission instruction 5 that is issued to the data transmission node 1 has completely the same packet format as the one in the first embodiment shown in FIG. 2.

Here, only the difference between the first embodiment and the present embodiment is that the node identifier of packet receiver 13 and the node identifier of data receiver 19 take the same value.

Apart from the above, with regard to the operation of the third embodiment and the method of controlling the data transmission node 1, it is possible to perform data transfers by performing the same processing as in the previously-described first embodiment.

By comparing the first to third embodiments to define a data transfer method for transferring data from the data transmission node 1 to the data reception node 2 under the control of the control node 3, it is possible to provide a system architecture capable of flexibly coping with various system configurations and capable of achieving high processing efficiencies.

Fourth Embodiment

Figure 7:
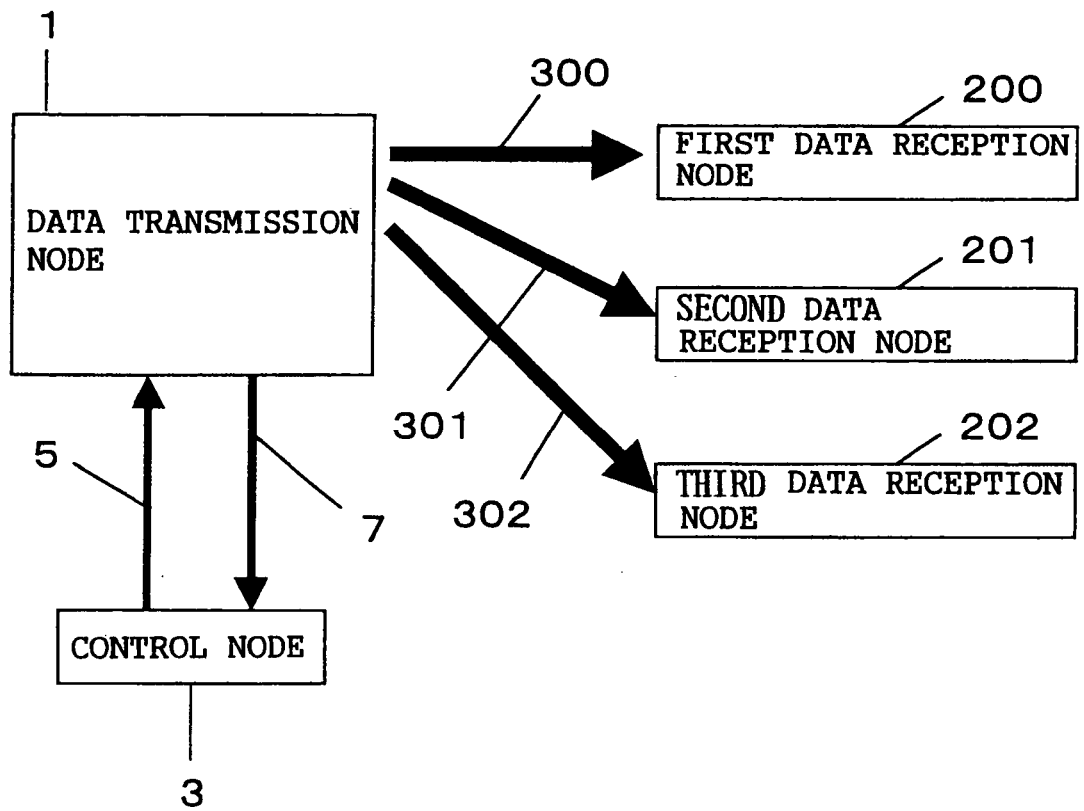
FIG. 7 is a block diagram of a system employing a data transfer method according to a fourth embodiment of the present invention.

A fourth embodiment of the present invention will now be explained. FIG. 7 is a block diagram for the description of the fourth embodiment of the present invention, and more specifically it illustrates a system for transferring in parallel a piece of data to a plurality of nodes. FIG. 7 shows a transmission node identified by the reference numeral 1, a control node identified by the reference numeral 3, a data transmission instruction identified by the reference numeral 5, a data transmission instruction response identified by the reference numeral 7, a first data reception node identified by the reference numeral 200, a second data reception node identified by the reference numeral 201, and a third data reception node identified by the reference numeral 202. FIG. 7 further shows a datablock 300 that is transferred to the first data reception node 200, a datablock 301 that is transferred to the second data reception node 201, and a datablock 302 that is transferred to the third data reception node 202.

By making reference to FIG. 7, the operation of the fourth embodiment of the present invention will be discussed below. For the sake of simplifying the description, a data reception indication instruction that is issued from the control node 3 to a data reception node and a data reception indication instruction response that is issued from a data reception node to the control node 3 are omitted in the figure.

Here, a transfer of the third datablock 28 present in the data transmission node 1 to the three data reception nodes 200–202 is shown.

In the first place, the control node 3 issues to the data transmission node 1 the data transmission instruction 5 instructing that the third datablock 28 be transmitted to the first data reception node 200. Upon completion of the transferring of the third datablock 28 to the first data reception node 200, the control node 3 issues to the data transmission node 1 the data transmission instruction 5 instructing that the third datablock 28 be transmitted to the second data reception node 201. Upon completion of the transferring of the third datablock 28 to the second data reception node 201, the control node 3 issues to the data transmission node 1 the data transmission instruction 5 instructing that the third datablock 28 be transmitted to the third data reception node 202. Upon completion of the transferring of the third datablock 28 to the third data reception node 202, the data transmission instruction 5 is sequentially issued for the transferring of the fourth datablock 29.

By virtue of the operation of the control node 3, it becomes possible to transfer in parallel a single item of data to a plurality of data reception nodes. In the case the data transmission node 1 is a device which takes a long time for preparing a datablock for transmission such as a tape device or a device which is slow in data transfer rate, the number of times a datablock is prepared decreases in comparison with in-series processing. As a result, the total processing time is reduced.

TABLE 7 shows the data field values of packets for the data transmission instructions that are issued by the control node 3 to the data transmission node 1 (FIG. 7). More specifically, TABLE 7 describes the data field values of the data transmission instructions issued to the first data reception node 200, to the second data reception node 201, and to the third data reception node 202, respectively. Here, in the first and second datablock transmission instructions, the value of the datablock retransmission request bit 16 is set at a value of 1, while on the contrary the value of the datablock retransmission request bit 16 is set at a value of 0 in the third data transmission instruction. TABLE 8 shows the data field values of packets for the data transmission indication instruction responses with respect to these data transmission instructions. In TABLE 8, since the data transmission indication instruction was issued with the datablock retransmission request bit 16 set at 1, a value of three as the datablock number (as instructed) and a value of 32 K bytes as the datablock data length are returned with respect to the first and second data reception nodes 200 and 201. On the other hand, for the case of the third data reception node 202, since the data transmission indication instruction was issued with the datablock retransmission request bit 16 set at 0, a value of 4 and a value of 22 K bytes are returned as the datablock number and as the datablock data length, respectively. The final datablock notification bit is set at 1, thereby indicating that the next datablock is the last datablock.

TABLE 7

| Data field | Command for first data reception node | Command for second data reception node | Command for third data reception node |
| --- | --- | --- | --- |
| Node identifier of packet receiver | Node identifier of data transmission node 1 | Node identifier of data transmission node 1 | Node identifier of data transmission node 1 |
| Node identifier of packet sender | Node identifier of control node 3 | Node identifier of control node 3 | Node identifier of control node 3 |
| Command code | Data transmission indication | Data transmission indication | Data transmission indication |
| Datablock retransmission request bit | 1 | 1 | 0 |
| Error code storing region | FF(16) | FF(16) | FF(16) |
| Final datablock notification bit | 1 | 1 | 1 |
| Node identifier of data receiver | Node identifier of data reception node 1 | Node identifier of data reception node 2 | Node identifier of data reception node 3 |
| Datablock number | 3 | 3 | 3 |
| Datablock data length | 32 KB | 32 KB | 32 KB |

TABLE 8

| Data field | Response from first data reception node | Response from second data reception node | Response from third data reception node |
| --- | --- | --- | --- |
| Node identifier of packet receiver | Node identifier of control node 3 | Node identifier of control node 3 | Node identifier of control node 3 |
| Node identifier of packet sender | Node identifier of data reception node 1 | Node identifier of data reception node 2 | Node identifier of data reception node 3 |
| Command code | Data transmission indication | Data transmission indication | Data transmission indication |
| Datablock retransmission request bit | 1 | 1 | 0 |
| Error code storing region | No error | No error | No error |
| Final datablock notification bit | 0 | 0 | 1 |
| Node identifier of data receiver | Node identifier of data reception node 1 | Node identifier of data reception node 2 | Node identifier of data reception node 3 |
| Datablock number | 3 | 3 | 4 |
| Datablock data length | 32 KB | 32 KB | 22 KB |

Here, when the datablock retransmission request bit 16 is set at 1, the data transmission node 1 does not make preparation for the transfer of the next datablock but holds the datablock just previously transmitted. On the other hand, if the datablock retransmission request bit 16 is set at 0, the data transmission node 1 performs an operation of preparing for the transfer of the next datablock.

In other words, by the provision of the datablock retransmission request bit 16, it becomes possible to facilitate and speed up the processing of the data transmission node even when transmitting the same data to a plurality of data reception nodes as in the present embodiment.

Fifth Embodiment

Figure 8:
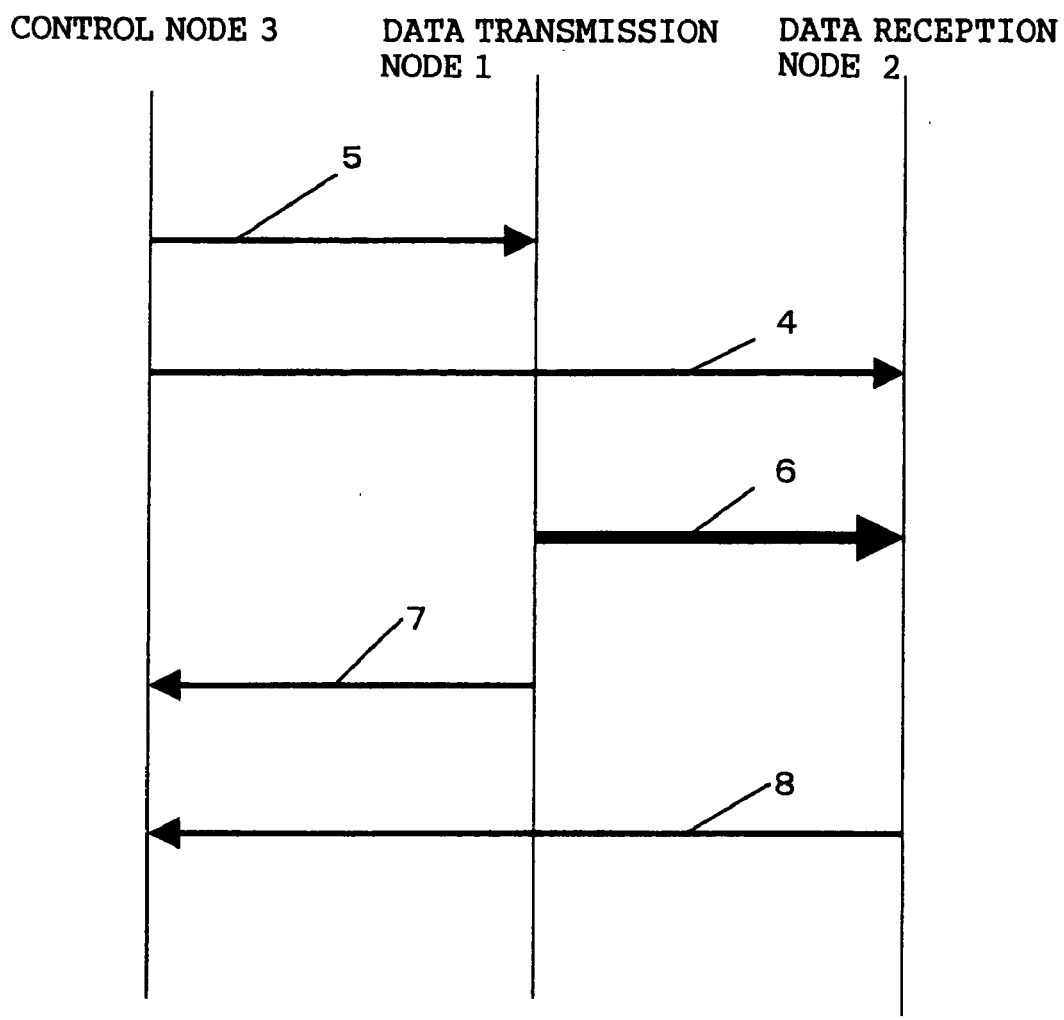
FIG. 8 is a diagram showing the operation of a system employing a data transfer method according to a fifth embodiment of the present invention.

Next, a fifth embodiment of the present invention will be described. FIG. 8 is a diagram showing the operation of the fifth embodiment of the present invention. More specifically, FIG. 8 illustrates the operation of a system which performs no datablock division in transferring a single item of data. Here, the description will be made using an example case in which a still-image data sheet of 150 K bytes, as shown in FIG. 4, is transferred. In the present embodiment, division of data into datablocks is carried out between the data transmission node 1 and the data reception node 2, and the control node 3 is not involved in such a division operation. System constitutional elements of the present embodiment are basically the same as the ones described in FIG. 1 and their description is omitted here. Hereinafter, the operation of the fifth embodiment of the present invention will be described with reference to FIG. 8.

In the first place, the control node 3 issues to the data transmission node 1 the data transmission instruction 5 to instruct the data transmission node 1 to prepare for data transfer. Next, the control node 3 issues to the data reception node 2 the data reception instruction 4, to instruct the data reception node 2 to start data reception processing. Here, a data transfer process 6 from the data transmission node 1 to the data reception node 2 is executed, whereby the one still-image data sheet is transferred. Details of the data transfer process 6 will be described later.

After having finished the data transfer process 6, the data transmission node 1 transmits to the control node 3 the data transmission instruction response 7 including a result of execution of the data transfer processing. On the other hand, the data reception node 2, which has completed its data reception process, transfers to the control node 3 the data reception instruction response 8 including a result of execution of the data reception processing. By the above-described procedure, the one still-image data sheet is transferred.

Which one of the data transmission instruction response 7 and the data reception instruction response 8 is issued before the other, is determined by the balance in processing rate between the data transmission node 1 and the data reception node 2. It is possible that the issue order differs from that of the present embodiment.

Figure 9:
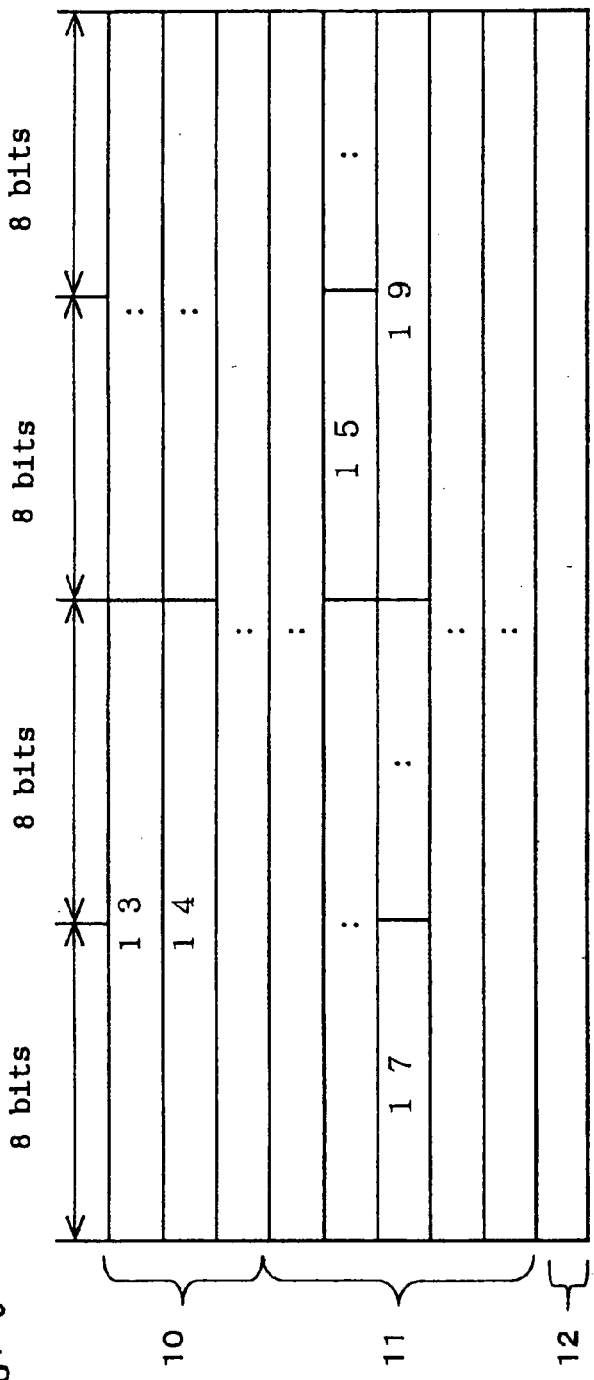
FIG. 9 is a diagram illustrating a data format used for a data transmission instruction and a data transmission instruction response according to the fifth embodiment of the present invention.

FIG. 9 shows a data format used for the data transmission instruction 5 and the data transmission instruction response 7 of the present embodiment. FIG. 9 shows constitutional elements most of which are common to the first embodiment of the present invention shown in FIG. 2 and the description of fields having the same meaning will therefore be omitted. FIG. 9 shows a packet header portion 10, a datablock (command frame) portion 11, and a CRC portion 12. FIG. 9 further shows a node identifier of packet receiver 13 of 16 bits and a node identifier of packet sender 14 of 16 bits and these two identifiers 13 and 14 together form an IEEE 1394-1955 asynchronous write packet.

The reference numerals 15, 17, and 19 denote a data transmission indication command, an error code storing region, and a node identifier of data receiver, respectively.

Here, the data transmission instruction of the present embodiment shown in FIG. 9 is compared with the data transmission instruction of the first embodiment shown in FIG. 2, and the result shows that the former instruction has a simpler data format than the latter instruction because of the absence of information such as the datablock retransmission request bit 16, the final datablock notification bit 18, the datablock number 20, and the datablock data length 21.

Figure 10:
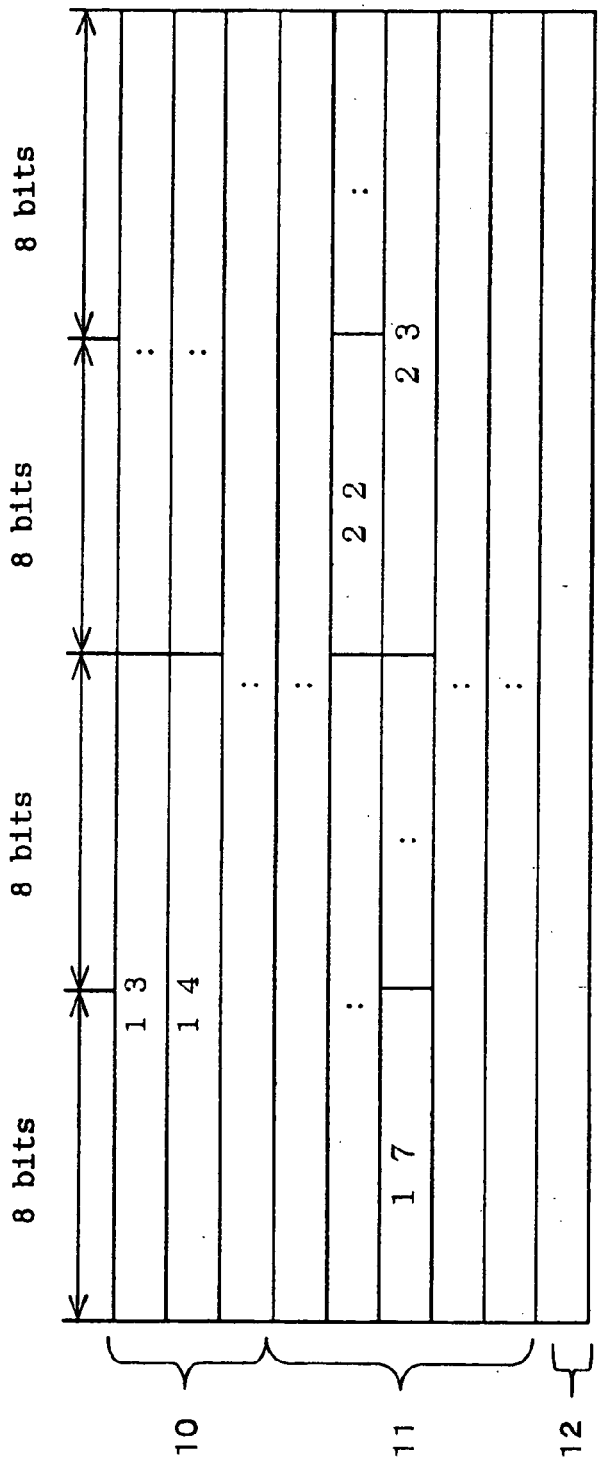
FIG. 10 is a diagram illustrating a data format used for a data reception instruction and a data reception instruction response according to the fifth embodiment of the present invention.

Referring now to FIG. 10, there is illustrated a data format used for the data reception instruction 4 and the data reception instruction response 8. FIG. 10 shows constitutional elements most of which are common to the data format shown in FIG. 3 and the description of fields having the same meaning will therefore be omitted. FIG. 10 shows a datablock reception command code indicative of datablock reception, and a node identifier of data sender 23.

Here, the data reception indication instruction of the present embodiment shown in FIG. 10 is compared with the data reception indication instruction of the first embodiment shown in FIG. 3, and the result shows that the former instruction has a simpler data format than the latter instruction because of the absence of information such as the datablock number 20 and the datablock data length 21.

Figure 11:
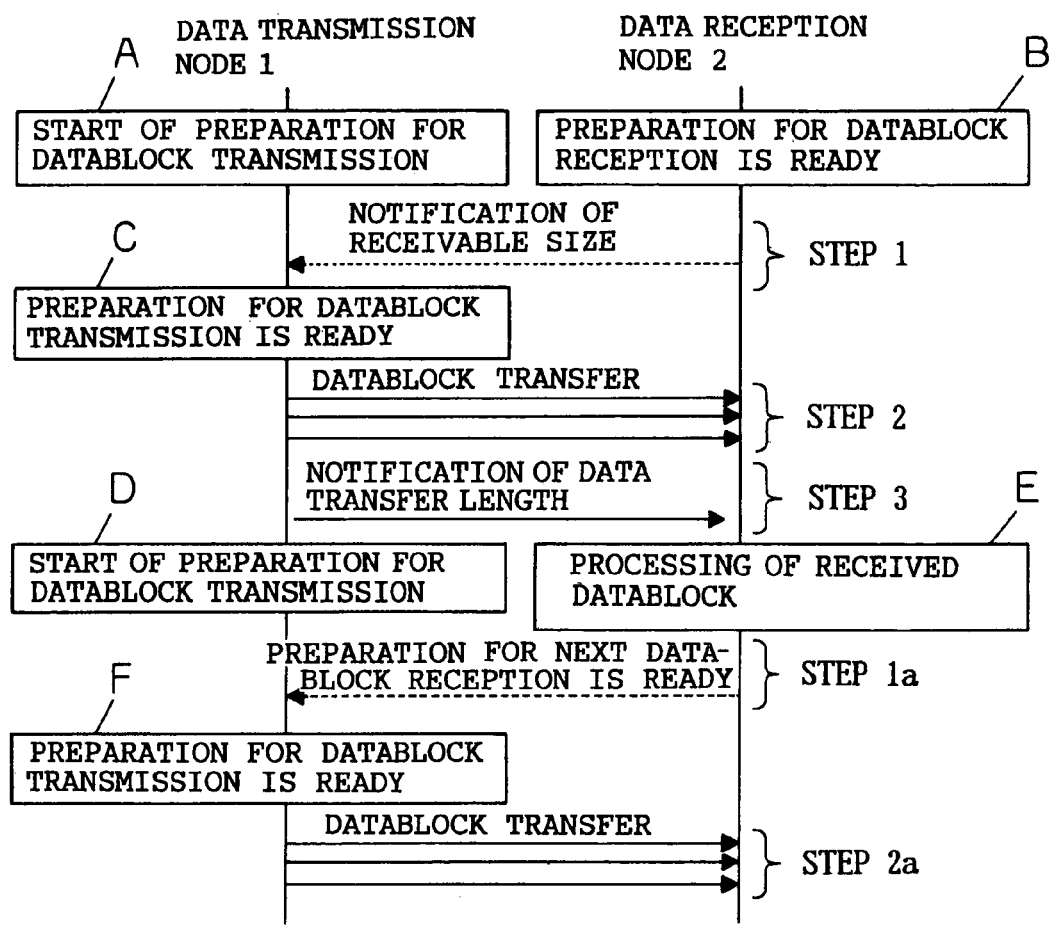
FIG. 11 is a diagram illustrating a part of the operation of data transfer processing according to the fifth embodiment of the present invention.

Next, the data transfer processing of the present embodiment will now be described in detail. FIG. 11 is a diagram showing a part of the data transfer processing operation according to the fifth embodiment of the present invention. More specifically, FIG. 11 is a diagram for the description of the processing contents of first portions of the data transfer process 6 of FIG. 8.

The data reception node 2 of the present embodiment contains therein a data buffer for receiving and its capacity is 256 K bytes. Here, suppose that the maximum data length of IEEE 1394-1995 asynchronous write packets receivable by the data reception node 2 is 256 bytes, and that the maximum data length of IEEE 1394-1995 asynchronous write packets transmittable by the data transmission node 1 is 32 K bytes.

In the present embodiment; when delivering a notification from the data reception node 2 to the data transmission node 1 and when delivering a notification from the data transmission node 1 to the data reception node 2, an IEEE 1394-1995 write packet including 32-bit data is issued.

Figure 12:
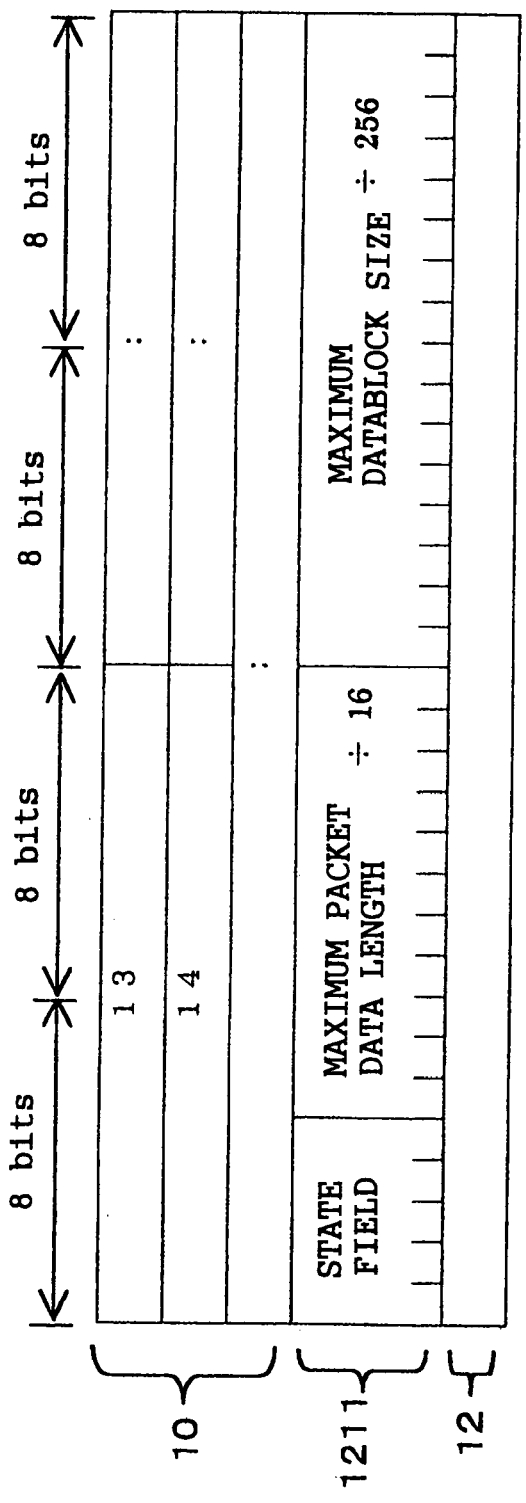
FIG. 12 is a diagram illustrating a format of 32-bit data of a packet used for notification from a data reception node 2 to a data transmission node 1 according to the fifth embodiment of the present invention.

The packet, used for the delivering of a notification from the data reception node 2 to the data transmission node 1, has a 32-bit data format as shown in FIG. 12.

Here, the values that are set in a state field recorded in a data portion 1211 shown in FIG. 12 and their meanings are shown below in TABLE 9.

TABLE 9

| State field bit | State field value | Meaning |
| --- | --- | --- |
| 00000 | EMPTY | Ready for reception |
| 01000 | CONSUMING | Under data processing |
| 10000 | COMPLETE | Data transfer completed |
| 11111 | ABORT | Data transfer interrupted |

Figure 13:
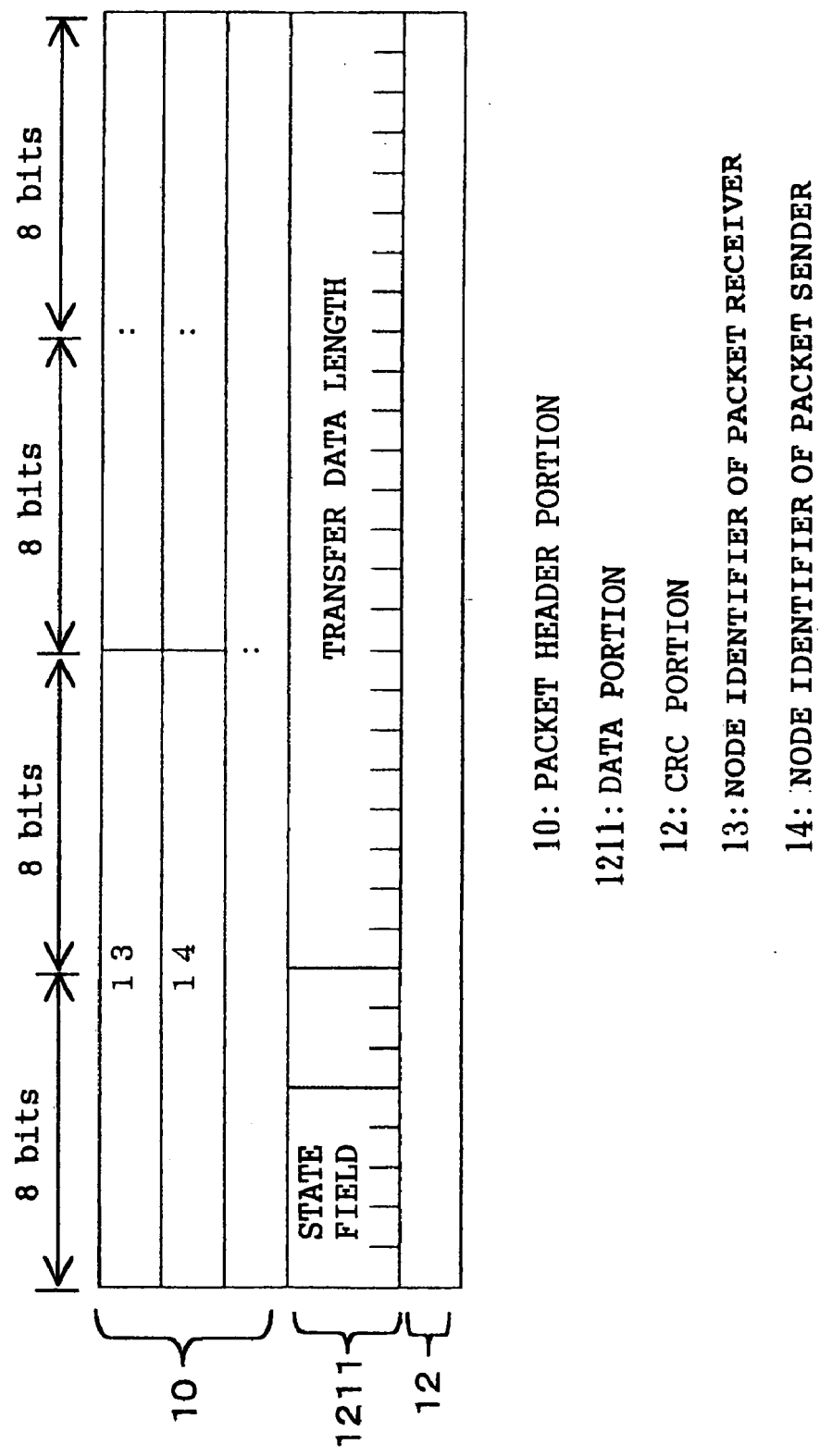
FIG. 13 is a diagram illustrating a format of 32-bit data of a packet used for notification from the data transmission node 1 to the data reception node 2 according to the fifth embodiment of the present invention.

The packet, used for the delivering of a notification from the data transmission node 1 to the data reception node 2, has a 32-bit data format as shown in FIG. 13.

Here, the values that are sent in a state field recorded in the data portion 1211 shown in FIG. 13 and their meanings are shown below in TABLE 10.

TABLE 10

| State field bit | State field value | Meaning |
| --- | --- | --- |
| 00000 | READY | Datablock transfer completed |
| 01000 | PREPARING | Under data processing |
| 10000 | COMPLETE | Data transfer completed |
| 11111 | ABORT | Data transfer interrupted |

Here, the operation of transferring data according to the present embodiment will be described by making reference to FIG. 11. As shown in phase A of FIG. 11, upon receipt of a data transmission indication instruction from the control node 3, the data transmission node 1 starts preparing for a datablock to be transferred. Meanwhile, as shown in phase B, upon receipt of a data reception indication instruction from the control node 3, the data reception node 2 prepares for receiving the data from the data transmission node 1.

Next, as shown in step 1, when the data reception node 2 completes the data reception preparation, the data reception node 2 notifies the data transmission node 1 of a data size receivable by the data reception node 2.

Here, the values of a packet transmitted at step 1 are as follows.

TABLE 11

| Field | Value |
| --- | --- |
| State field | EMPTY |
| Maximum packet data length | 16 × 16 = 256 Bytes |
| Maximum datablack size | 256 × 256 = 64 K Bytes |

Next, upon receipt of the notification of step 1 from the data reception node 2, the data transmission node 1 starts transmitting the datablock at step 2 after completion of the datablock transfer preparation (see phase C of FIG. 11). Here, taking in account that the data length receivable by the data reception node 2 is 64 K bytes, the data transmission node 1 sets the length of a datablock that is to be transmitted at a value lower than 64 K bytes. In this case, the maximum data packet data length transmittable by the data transmission node 1 is 32 K bytes, and the data transmission node 1 intends to transmit 32 K bytes at a single data transfer.

Next, as shown in step 3, the data transmission node 1 starts the transferring of the datablock by continuously transmitting an asynchronous write packet to a buffer region of the data reception node 2.

At this step 3, the datablock is broken up into a plurality of packets for forwarding to the data reception node 2. Since, from the notification of step 1, the data transmission node 1 has already-learned that the maximum packet data length receivable by the data reception node 2 is 256 bytes, the datablock of 32 k bytes is divided into packets of 256 bytes. In other words, in the present embodiment, 128 packets will be transmitted.

These asynchronous write packets each contain therein an offset address indicative of a data reception buffer region in an address space of the data reception node 2. These offset addresses are sequentially incremented from the data receive buffer region's head address, as in the first embodiment.

Next, upon completion of the datablock transfer, the data transmission node 1 transmits a packet including a transmitted data length, thereby to notify the data reception node 2 that the datablock transfer has been completed, as shown in step 3.

Such a packet contains the following information.

TABLE 13

| Field | Value |
| --- | --- |
| State field | READY |
| Data length transmitted | 32 K Bytes |

When the notification of step 3 is finished, the data transmission node 1 starts preparing for the next datablock transfer, as shown in phase D. Meanwhile, the data reception node 2 starts processing the received datablock as shown in phase E. In the present embodiment, the data reception node 2 is a printer unit, so that the data reception node 2 starts a process of sending the datablock stored in a buffer region (not shown) to an image engine of the printer unit.

Next, at a stage when the data reception node 2 finishes processing the datablock, the data reception node 2 issues a notification informing that the data reception node 2 is ready for receiving the next datablock, as shown in step 1a. In the issue of such a notification, the same packet as in step 1 is transmitted.

Further, at a stage when a preparation for the datablock that is to be transferred next is ready as shown in phase F, the data transmission node 1 starts transmitting the next datablock, as shown in step 2a.

Here, again, the datablock is broken up into a plurality of packets for forwarding to the data reception node 2. These packets have offset addresses of the data reception node 2 which are sequentially incremented from the data receive buffer region's head address, as in the previous datablock transfer.

In the way described above, the steps 1 to 3 are repeatedly carried out, so that one still-image data sheet is divided into a plurality of datablocks for transfer to the data reception node 2.

Figure 14:
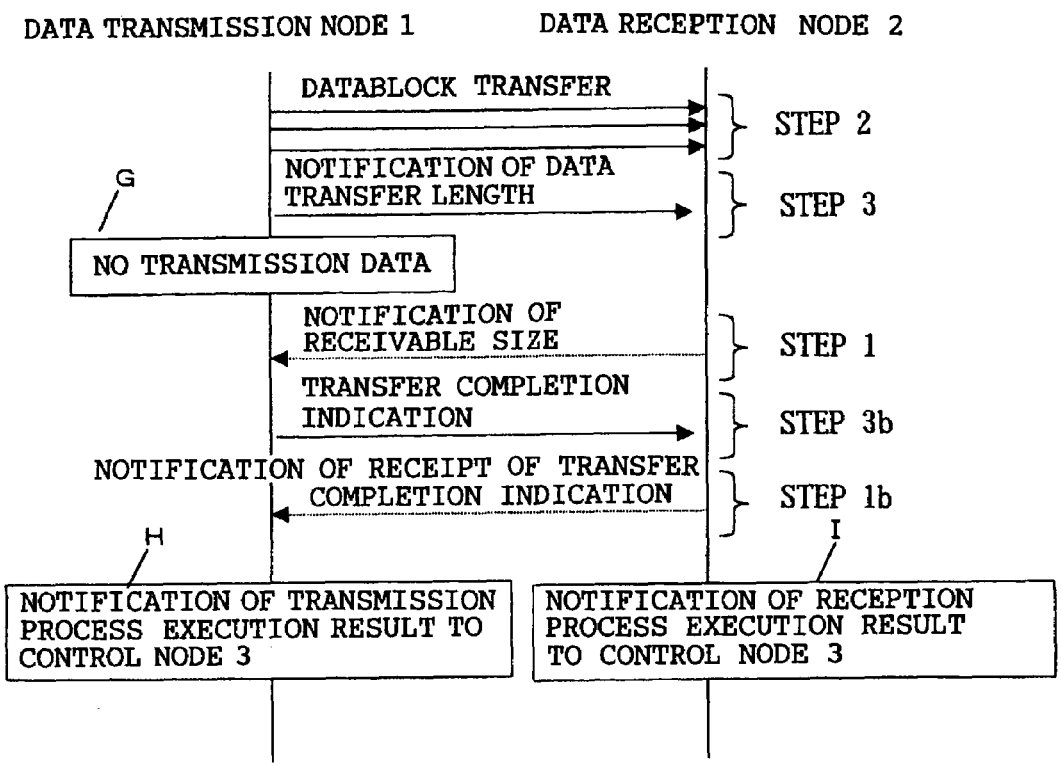
FIG. 14 is a diagram showing a termination operation of the data transfer processing according to the fifth embodiment of the present invention.

Next, the processing of the last datablock will be described. FIG. 14 is a diagram for the description of a termination operation after the transfer of the last datablock is completed.

Although the data transmission node 1 starts preparing for the transfer of the datablock that is transferred next after the datablock transfer at step 3 is finished, it becomes known that there exists no data that is to be transmitted, as shown in phase G.

Next, the data reception node 2 issues to the data transmission node 1 a notification indicative of a data size receivable by the data reception node 2, as in step 1. In response to such a message notification, the data transmission node 1 transmits to the data reception node 2 a transfer completion indication at step 3b.

The packet at this time contains the following information.

TABLE 13

| Field | Value |
| --- | --- |
| State field | COMPLETE |
| Data length transmitted | 0 Byte |

Next, in response to the notification of step 3b, the data reception node 2 transmits to the data transmission node 1 a notification indicative of the reception of the transfer completion indication.

The packet at this time contains the following information.

TABLE 14

| Field | Value |
| --- | --- |
| State field | COMPLETE |
| Maximum packet data length | 16 × 16 = 256 Bytes |
| Maximum datablock size | 256 × 256 = 64 K Bytes |

The data transmission node 1, which have received the notification of step 1b, issues to the control node 3 a data transmission indication instruction response, whereby the image sheet transmission is completed, as shown in phase H. Phase H is equivalent to the data transmission instruction response 7 of FIG. 8.

Further, the data reception node 2, which have transmitted the notification of step 1b, issues to the control node 3 of a data receipt indication instruction response, whereby the image sheet reception is completed, as shown in phase I. Phase I is equivalent to the data reception instruction response 8 of FIG. 8.

A data transfer from the data transmission node 1 to the data reception node 2 is carried out by repetition of performing the following steps of:

(1) a first step in which the second node transmits to the first node a notification representative of a data receivable state;

(2) a second step in which, at the time when the datablock is ready for transfer after reception of the notification from the second node, the first node performs an operation of transferring the datablock to the second node; and (3) a third step in which the first node transmits to the second node a notification representative of completion of the datablock transfer. By repetition of performing these first to third steps, the number of commands to be issued by the control node to each of the data transmission node and the data reception node is one. This makes it possible to simplify the operation of the control node. Further, the data transmission node notifies the data reception node of completion of a datablock transmission preparation. On the other hand, the data reception node notifies the data transmission node of completion of a datablock reception preparation. As a result of such arrangement, it becomes possible to easily cope with combinations of data transmitting and receiving devices having various processing rates.

Further, the notification of the first step contains therein information about a maximum data length receivable by the data reception node at the second step, which allows the data transmission node to directly detect, based on the information, a datablock length receivable by the data reception node. This therefore provides simplified data transfer in which the control node which issues commands is not required to control the data length of datablocks.

Further, when at the second step the datablock to be transferred is broken up into more than one packet, the notification of the first step contains a maximum data length receivable by the data reception node for a single packet, whereby the data transmission node is able to easily packet-divide the data to be transferred at the second step, according to the data reception node's reception capability. It therefore becomes possible to easily cope with devices having various packet reception capabilities.

In the present embodiment, the description has been made by taking an example case in which the maximum datablock size and the maximum packet data length of the data reception node 2 remain unchanged. These values, however, may be values variable according to the internal processing state of the data reception node 2.

For example, although the data transmission node 1 is capable of transmitting a datablock of 256 K bytes at the most and the data reception node 2 is capable of receiving a datablock of 256 K bytes at the most, the data reception node 2 returns to the data transmission node 1 a response informing that it has only a processing capability of 128 K bytes because two data reception processes are being carried out at the same time. In this case, the transfer of a datablock of 128 K bytes is carried out accordingly.

Here, at the time when the data reception node 2 completes the other of the two data reception processes, memory of 128 K bytes which has been unavailable so far can be used now. Thereafter, the data reception node 2 will make a change in maximum datablock size from 128 K bytes to 256 K bytes. Next, upon detection of the change that the data reception node 2 is now capable of 256 K-byte data reception, the data transmission node 1 starts the transfer of a datablock of 256 K bytes to the data reception node 2.

Further, it is needless to say that much more efficient data transfers can be achieved by the data reception node 2 varying in maximum packet data length so as to enable the data transmission node 1 to transfer a data packet having a much greater data length.

In the way described above, by returning, according to the internal processing state of the second node, a variable maximum data length value receivable by the second node at the second step, it becomes possible to optimally control and make good use of internal resources of the second node such as memory resources.

Figure 15:
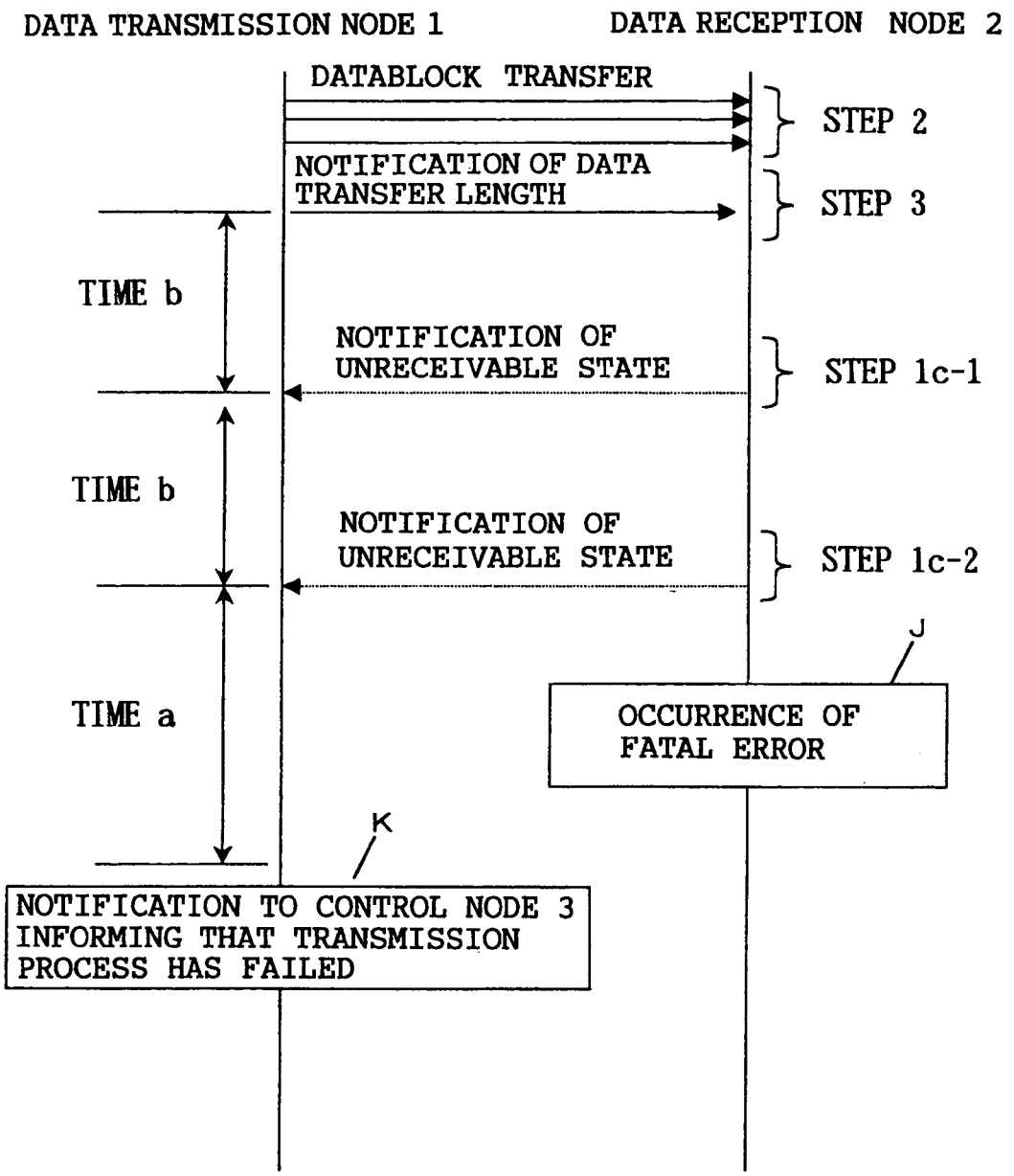
FIG. 15 is a diagram illustrating an operation when data transfer processing according to the fifth embodiment is delayed and an operation when data transfer processing according to the fifth embodiment is impossible to perform.

Next, reference is made to FIG. 15 in order to describe the operation when the data reception node 2 is a device which is very slow in data processing, and the error processing when the data reception node 2 enters the unreactive state.

In FIG. 15, the datablock length notification is issued at step 3. After the transfer of a datablock is completed, the data reception node 2 starts processing the datablock. At the same time, the data transmission node 1 starts an internal timer to start time measurement. If there is delivered no response from the data reception node 2 after an elapse of time a, the data transmission node 1 forms a judgment that the data reception node 2 enters the error state and is now being unreactive.

Here, if the data reception node 2 fails to complete the data processing after an elapse of time b (a>b), a notification representative of a data unreceivable state is issued at step 1c-1. The packet issued at step 1c-1 contains the following information.

TABLE 15

| Field | Value |
| --- | --- |
| State field | CONSUMING |
| Maximum packet data length | 16 × 16 = 256 Bytes |
| Maximum datablock size | 256 × 256 = 64 K Bytes |

Upon receipt of the notification of step 1c-c, the data transmission node 1 resets the value of the timer and restarts time measurement.

Here, if the data reception node 2 enters the data reception preparation ready state before the time b has elapsed from the notification of step 1c-c, the receivable size notification of step 1 of FIG. 11 is issued and thereafter the processing is continued according to the procedure of FIG. 11.

If the data processing is not completed even after the time b has elapsed, a notification representative of a data unreceivable state is issued at step 1c-2. The packet thus issued is the same as the one at step 1c-1.

The data transmission node 1 again resets the timer and restarts time measurement.

If such a fatal error occurs that the data reception node 2 is made to enter the unreactive state after the notification of step 1c-2 is issued, as shown in phase J, the data transmission node 1 detects, after an elapse of the time a from the notification of step 1c-2, that the data reception node 2 is now being unreactive. Thereafter, the data transmission node 1 notifies the control node 3 that the data transmission has failed, as shown in phase K, and the data transmission processing is stopped.

In response to the notification of phase K, the control node 3 investigates the state of the data reception node 2 to obtain a necessary error state. When the control node 3 tries to examine the state of the data reception node 2, if the data reception node 2 still remains unreactive, then the control node 3 performs, for example, a process of informing the user that an error has occurred in the data reception node 2, and that the data reception node 2 is being in the unreactive state.

When the occurrence of an error is detected by the data reception node 2 and an operation of responding to the data transmission node 1 is possible to perform at phase J (not shown), the data transfer can be interrupted by transmitting a packet as shown below.

TABLE 16

| Field | Value |
| --- | --- |
| State field | ABORT |
| Maximum packet data length | 16 × 16 = 256 Bytes |
| Maximum datablock size | 256 × 256 = 64K Bytes |

In such a case, both the data transmission node 1 and the data reception node 2 issue to the control node 3 respective notifications informing that the error has occurred.

As described above, if, after an elapse of the predetermined time a from the time when the datablock length notification at the third step is completed, the first node receives no notification from the second node, the first node performs a process of stopping the data transfer. On the other hand, if the second node still fails to enter the data receivable state within the predetermined time b (a>b), the second node will transmit to the first node a notification representative of a data unreceivable state. This causes the first node to change to the wait state so as to wait for a notification from the second node. The first node measures the predetermined time a over again. Accordingly it becomes possible to correctly distinguish between an error state and a device process wait state even when using a very slow device on the data reception end.

Figure 16:
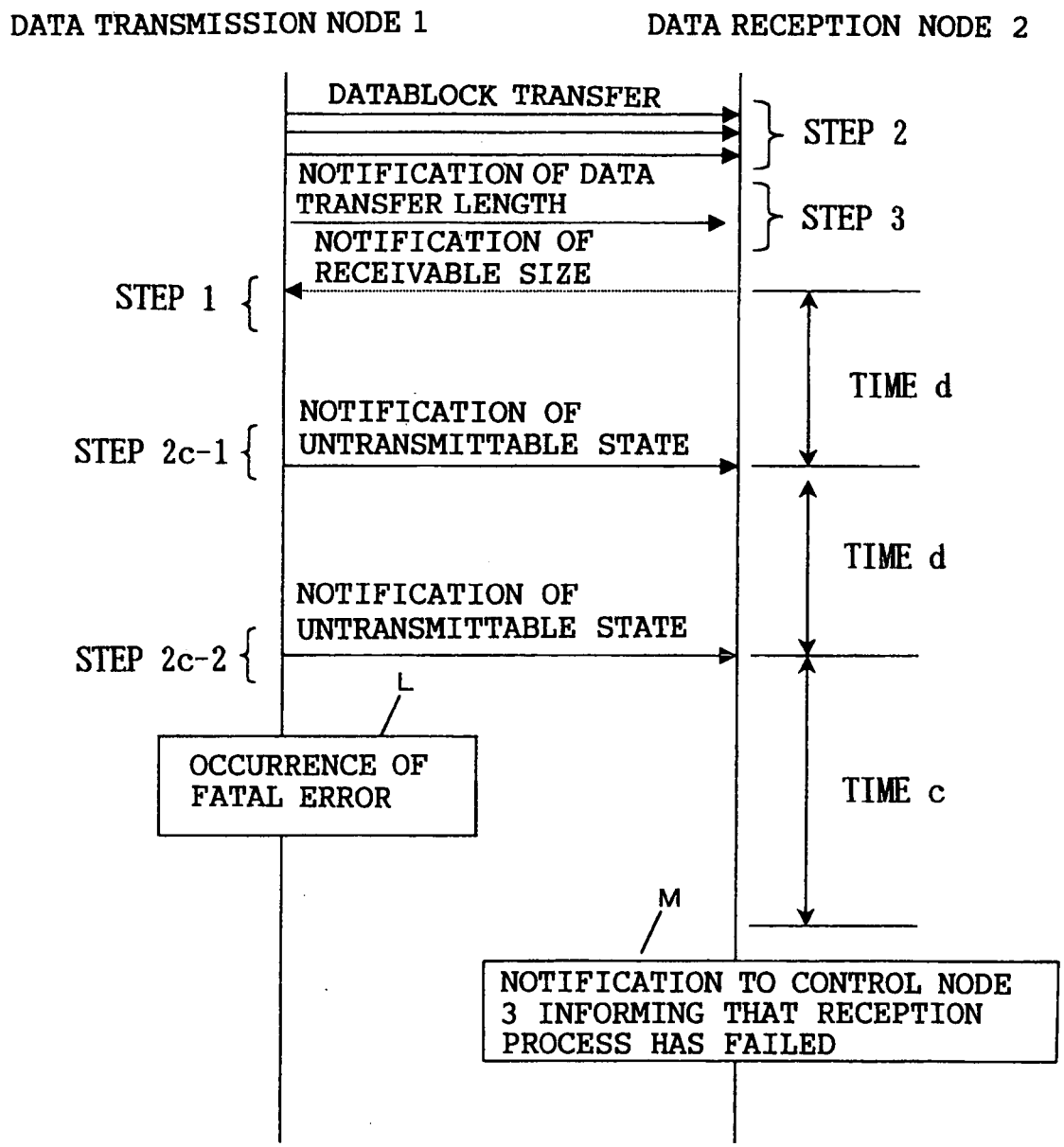
FIG. 16 is a diagram illustrating an operation when data reception processing according to the fifth embodiment is delayed and an operation when data reception processing according to the fifth embodiment is impossible to perform.
Figure 17:
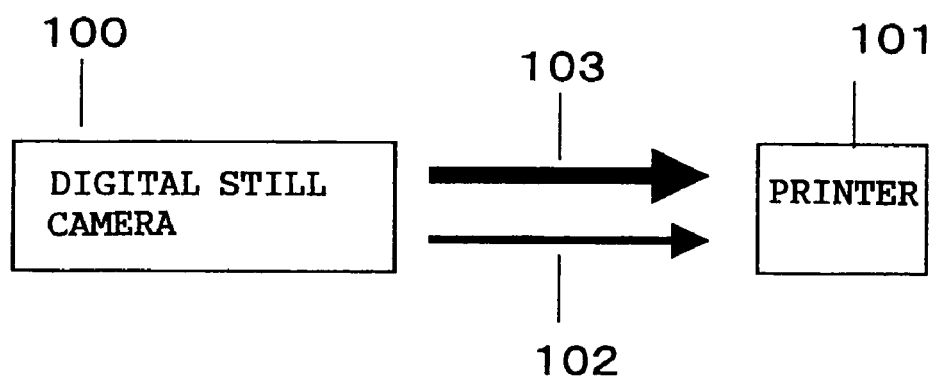
FIG. 17 is a block diagram of a first example of a still-image data system according to a conventional data transfer method.
Figure 18:
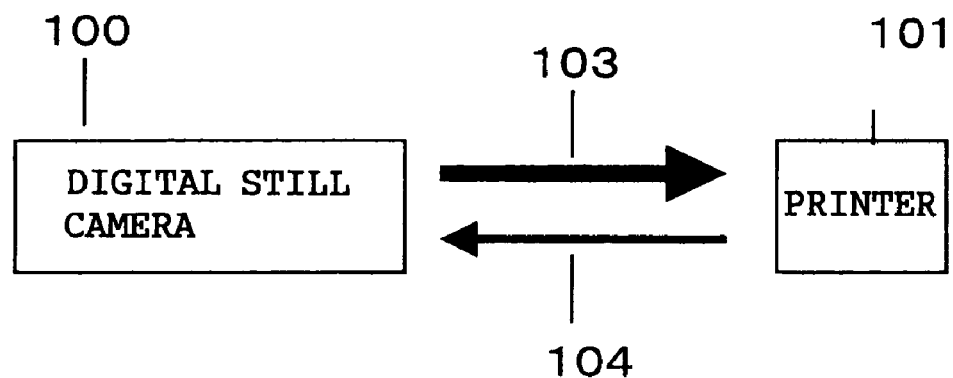
FIG. 18 is a block diagram of a second example of still-image data system according to the conventional transfer method.
Figure 19:
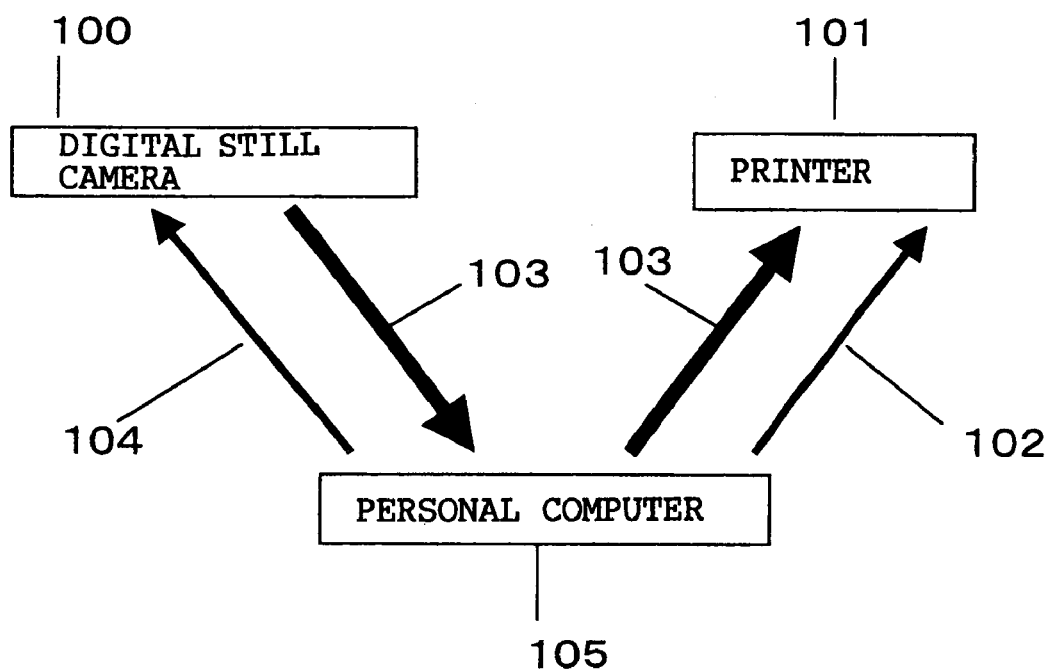
FIG. 19 is a block diagram of a third example of still-image data system according to the conventional a transfer method.
Figure 20:
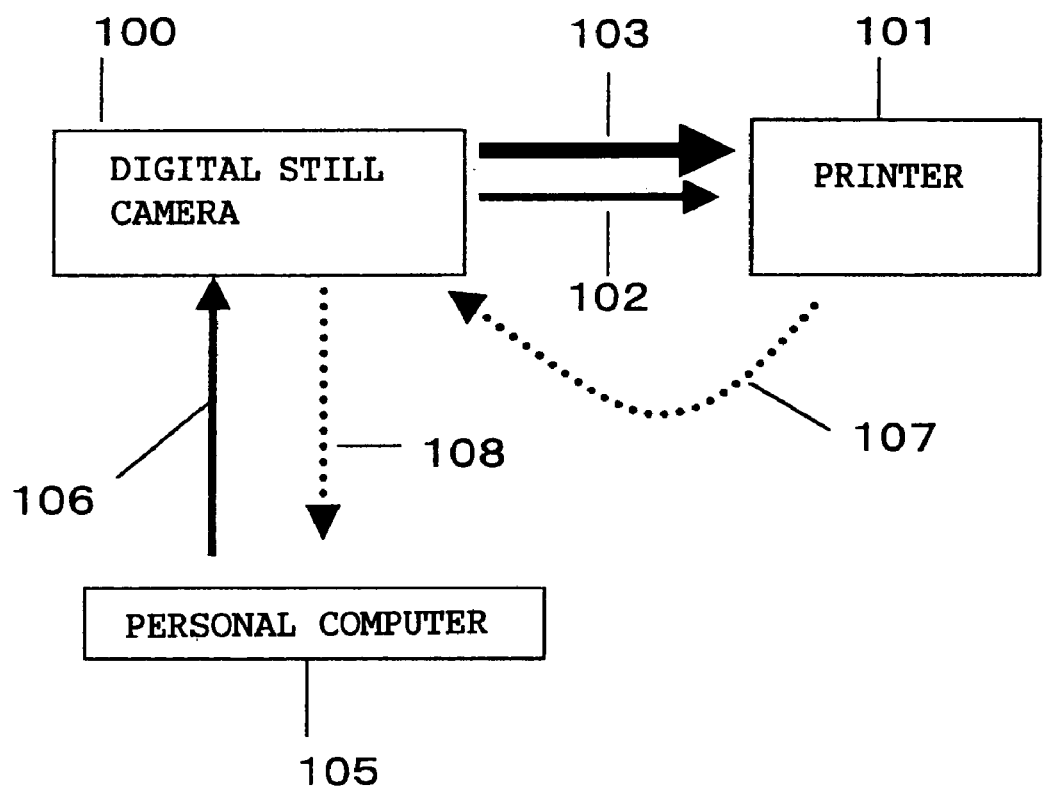
FIG. 20 is a block diagram showing an example of till-image data system employing a conventional, roved data transfer method.

Next, by making reference to FIG. 16, the operation performed when the data transmission node 1 is implemented by a very slow device, is described, together with the error processing when the data transmission node 1 enters the unreactive state.

Referring to FIG. 16, after the data transfer length notification is completed (step 3), the data reception node 2 processes the datablock received and issues a notification indicative of receivable size and a notification representative of reception preparation completion, as shown in step 1.

Meanwhile, the data transmission node 1 starts preparing for the next datablock after the datablock transfer of step 3 is completed. Upon receipt of the notification of step 1, the data transmission node 1 causes its internal timer to start, whereby time measurement is commenced. Even when a time c elapses, if there is still no response from the data transmission node 1, the data reception node 2 then forms a judgment that the data transmission node 1 has now entered the error state to be unreactive.

Here, when the data transmission node 1 fails to complete a preparation for the data even after an elapse of a time d (c>d), the data transmission node 1 transmits a notification representative of a data intranmittable state at step 2c-1. The packet thus transmitted at step 2c-1 contains therein the following information.

TABLE 17

| Field | Value |
| --- | --- |
| State field | PREPARING |
| Data length transmitted | 32K Bytes |

Upon receipt of the notification of step 2c-1, the data reception node 2 resets the value of the timer to restart time measurement.

Here, if the data transmission node 1 enters the data transmission ready state before an elapse of the time d from the notification of step 2c-1, the transfer data length notification at step 2 of FIG. 11 is issued and, from then on, the processing will be continued according to the procedure of FIG. 11.

If the data preparation is still not ready even after a further elapse of the time d, the data untransmittable state notification is issued at step 2c-c. The packet thus issued is equivalent to the one at step 2c-1.

Here, the data reception node 2 resets the timer and restarts time measurement.

If such a fatal error occurs that the data transmission node 1 becomes unreactive after the notification of step 2c-c, as shown in phase L, is issued, the data reception node 2 detects, after an elapse of the time c from the notification of step 2c-2, that the data transmission node 1 is now being in the unreactive state. Thereafter, the data reception node 2 notifies the control node 3 that the reception processing has failed, as shown in phase M, and the data transfer processing is stopped.

In response to the notification of phase M, the control node 3 investigates the state of the data transmission node 1 to acquire a necessary error state. When the control node 3 tries to examine the state of the data transmission node 1, if the data transmission node 1 still remains unreactive, then the control node 3 performs, for example, a process of informing the user that the error has occurred in the data transmission node 1 and that the data transmission node 1 is now being in the unreactive state.

Further, when the occurrence of an error is detected by the data transmission node 1 and a process of responding to the data reception node 2 is possible to perform at phase L (not shown), the data transfer can be interrupted by transmitting the following packet.

TABLE 18

| Field | Value |
| --- | --- |
| State field | ABORT |
| Data length transmitted | 0 Byte |

In such a case, both the data transmission node 1 and the data reception node 2 perform a process of informing the control node 3 of an error occurrence.

As described above, if, after an elapse of the predetermined time c from the time when the notification of the first step is completed, the second node receives no notification from the first node, the second node performs a process of stopping the data transfer. If the first node still fails to enter the data transmittable state within the predetermined time d (c>d), the first node will transmit to the second node a notification representative of a data untransmittable state. This causes the second node to change to the wait state to wait for a notification from the first node. The second node measures the predetermined time c over again. Accordingly, it becomes possible to correctly distinguish between an error state and a device process wait state even when using a very slow device on the data transmission end.

A program recording medium such as a magnetic disk or optical disk in which to record a program for enabling a computer to execute the function of all or part of means in any configuration of the foregoing embodiments, is prepared. By the use of such a program recording medium to provide a configuration capable of achieving the same operation as above, the same effects can be shown.

In the above-described embodiments of the present invention, the description has been made by taking an example case in which the AV/C command is employed for the transmitting of instructions and responses. Other command transmission methods, however, may be used.

The description of the present invention has been made by taking an example case in which the IEEE 1394-1995 bus is used as a bus to which nodes are coupled. This is not to be considered restrictive. Other than the IEEE 1394-1995 bus, any bus can be employed as long as it can be coupled to a plurality of devices at the same time.

Further, the description of the present invention has been made by taking an example case in which all the datablocks except for the last one have the same datablock length. This is not always to be considered restrictive. All datablocks may have different datablock lengths. In such a case, the data length of datablocks that is to be transmitted is set so as to fall below the value of a data receivable size transmitted at the first step, and any data packets in excess of that value are ignored or rejected by the data reception node 2.

The description has been made for a case in which the control node exists independently of data transmission and reception nodes, for a case in which the control node is included in a data transmission node, and for a case in which the control node is included in a data reception node. It is however practically possible to form an actual system configuration by three devices, namely, an independent control node, a data transmission node containing a control node, and a data reception node containing a control node.

In such a case, any one of the devices, on which the user performs an operation by button operation, functions as a control node.

The data transmission node does not necessarily perform a fixed function such as a data transmission function and, likewise, the data reception node does not necessarily perform a fixed function such as a data reception function, in other words it is possible to employ a configuration so that a certain node serves as a data transmission node or data reception node, depending upon the type of command issued by the control node. It is needless to say that it is possible to couple together two digital still cameras to provide a system in which data are exchanged therebetween.

The data transfer method of the present invention provides a system capable of flexibly coping with various system configurations, capable of achieving high processing efficiencies, and capable of easy error processing.

INDUSTRIAL APPLICABILITY

As can be seen from the above description, the present invention provides a data transfer system in which data is broken up into N datablocks (where the number N is a natural number) for transfer from a first node to a second node on a bus system each of whose nodes is assigned a node identifier, wherein the data transfer system comprises, prior to transfer of the datablock, a step in which a control node (1) issues to the second node a datablock reception instruction containing therein a node identifier of the first node and issues to the first node a datablock transmission instruction containing therein a node identifier of the second node, (b) thereafter, a step in which the datablock transfer from the first node to the second node is executed, after the datablock transfer is completed, a step in which the first node notifies the control node of a result of execution of the datablock transfer processing, and a step in which the second node notifies the control node of a result of performing reception processing on the datablock. This accordingly makes it possible to provide a system capable of flexibly coping with various system configurations, capable of achieving high processing efficiency, and capable of easily processing errors.

What is claimed is:

1. A data transfer method wherein data is broken up into N datablocks (where the number N is a natural number) for transfer from a first node to a second node on a bus system each of whose nodes is assigned a node identifier, wherein prior to transfer of said datablock, a control node (1) issues to said second node a datablock reception instruction containing therein a node identifier of said first node and (2) issues to said first node a datablock transmission instruction containing therein a node identifier of said second node;

thereafter, said datablock transfer from said first node to said second node is executed;

after said datablock transfer is completed, said first node notifies said control node of a result of execution of said datablock transfer processing; and said second node notifies said control node of a result of execution of reception processing on said datablock.

2. The data transfer method according to claim 1, wherein, in a case where said control node and said first node are one and the same node, said datablock transmission instruction to said first node and said execution result notification from said first node to said control node are not issued onto said bus but are internally issued within said same node.

3. The data transfer method according to claim 1, wherein, in a case where said control node and said second node are one and the same node, said datablock reception instruction to said second node and said execution result notification from said second node to said control node are not issued onto said bus but are internally issued within said same node.

4. The data transfer method according to claim 1, wherein said second node ignores data transmitted from a node which is assigned an identifier different from said node identifier contained in said datablock reception instruction.

5. The data transfer method according to claim 1, wherein said control node issues said datablock transmission instruction after the issuing of said datablock reception instruction.

6. The data transfer method according to claim 1, wherein said control node issues said datablock reception instruction after the issuing of said datablock transmission instruction.

7. The data transfer method according to claim 5, wherein, every time the transferring of each of said datablocks is completed, said first node notifies said control node of a result of execution of said datablock transfer processing, and of whether a datablock to be transferred next is the last of said datablocks.

8. The data transfer method according to claim 5, wherein said datablock transmission instruction issued by said control node to said first node contains therein a data length of said datablock to be transferred; and wherein said datablock reception instruction issued by said control node to said second node contains therein a data length of said datablock to be received.

9. The data transfer method according to claim 8, wherein, every time the transferring of each of said datablocks is completed, said first node notifies said control node of a result of execution of said datablock transfer processing and a data length of a datablock to be transferred next.

10. The data transfer method according to claim 1 or claim 9, wherein, when said first node detects an error during the transfer of said datablock, said first node notifies said control node of a result of execution of said datablock transfer processing, and of a data retransfer request.

11. The data transfer method according to claim 1, wherein, when transferring the same datablock from said first node to M nodes (where the number M is a natural number), said control node performs a process of issuing a transmission indication instruction of said same datablock M times while performing another process of making changes in identifier of said M nodes which are to receive said same datablock, and performs control to repeat said processes N times (where the number N is a natural number) corresponding to the number of said datablocks.

12. The data transfer method according to claim 11, wherein, at the time when said control node issues to said first node said datablock transmission instruction, a flag is contained which indicates whether a datablock transmission instruction, which is scheduled to be issued next, directs said first node to transfer (a) the same data block or (b) the next datablock.

13. The data transfer method according to claim 6, wherein a transfer of data from said first node to said second node is carried out by repetition of performing each of the following steps of:

(1) a first step in which said second node transmits to said first node a notification representative of a data receivable state;

(2) a second step in which, at the time when said datablock is ready for transfer after reception of said notification from said second node, said first node performs an operation of transferring said datablock to said second node; and (3) a third step in which said first node transmits to said second node a notification representative of completion of said datablock transfer.

14. The data transfer method according to claim 13, wherein said notification of said first step contains therein a maximum data length receivable by said second node at said second step.

15. The data transfer method according to claim 14, wherein said notification of said third step contains therein a data length that said first node transmits at said second step.

16. The data transfer method according to claim 13,
wherein said notification of said third step contains therein information indicative of the presence or absence of a data transfer completion indication; and
wherein, if said notification of said third step has said data transfer completion indication, said second node then notifies said first node of the reception of said data transfer completion indication, thereby to terminate data transfer between said first node and said second node.

17. The data transfer method according to claim 13,
wherein, in said datablock transfer at said second step, said datablock to be transferred is broken up into one or more packets; and
wherein said notification of said first step contains therein a maximum data length receivable by said second node for one packet.

18. The data transfer method according to claim 14, wherein said maximum data length receivable by said second node is a value variable depending upon the internal processing state of said second node.

19. The data transfer method according to claim 13,
wherein after a predetermined time a has elapsed since said notification of said third step was completed, (1) said first node performs a process of stopping the transfer of said datablock in the absence of reception of said notification of said first step from said second node; or (2) if said second node fails to enter a receivable state within a predetermined time b (b<a), said second node transmits to said first node a notification representative of an unreceivable state thereby to cause said first node to change to a wait state for waiting for notification from said second node, and starts remeasuring the predetermined time a.

20. The data transfer method according to claim 13,
wherein, after a predetermined time c has elapsed since said notification of said first step was completed, (1) said second node performs a process of stopping the reception of said datablock in the absence of reception of said datablock from said first node, or (2) if said first node fails to enter a transmittable state within a predetermined time d (d<c), said first node transmits to said second node a notification representative of an untransmittable state thereby to cause said second node to change to a wait state for waiting for notification from said first node, and starts remeasuring the predetermined time c.

21. A data transfer system in which data is broken up into N datablocks (where the number N is a natural number) for transfer from a first node to a second node on a bus system each of whose nodes is assigned a node identifier;
wherein said data transfer system comprises a control node, said control node (1) issuing to said second node a datablock reception instruction containing therein a node identifier of said first node and (2) issuing to said first node a datablock transmission instruction containing therein a node identifier of said second node, prior to said datablock transfer;
wherein said first node (1) transfers said datablock to said second node after said datablock reception instruction and said datablock transmission instruction are issued from said control node, and (2) notifies said control node of a result of execution of said datablock transfer processing after said datablock transfer is completed; and
wherein said second node notifies said control node of a result of execution of reception processing on said datablock transferred from said first node.

22. The data transfer system according to claim 21, wherein, in a case where said control node and said first node are one and the same node, said datablock transmission instruction to said first node and said execution result notification from said first node to said control node are not issued onto said bus but are internally issued within said same node.

23. The data transfer system according to claim 21, wherein, in a case where said control node and said second node are one and the same node, said datablock reception instruction to said second node and said execution result notification from said second node to said control node are not issued onto said bus but are internally issued within said same node.

24. A data transfer controller comprising control means wherein, at the time when data is broken up into N datablocks (where the number N is a natural number) for transfer from a first node to a second node on a bus system each of whose nodes is assigned a node identifier, prior to said datablock transfer, said control means (1) issues to said second node a datablock reception instruction containing therein a node identifier of said first node and (2) issues to said first node a datablock transmission instruction containing therein a node identifier of said second node;
wherein said first node (1) transfers said datablock to said second node after said datablock reception instruction and said datablock transmission instruction are issued from said control means, and (2) notifies said control means of a result of execution of said datablock transfer processing; and
wherein said second node notifies said control means of a result of execution of reception processing on said datablock transferred from said first node.

* * * * *